US009575246B2

(12) United States Patent
Murotani et al.

(10) Patent No.: US 9,575,246 B2
(45) Date of Patent: Feb. 21, 2017

(54) PREPOLYMER, CURABLE MATERIAL, COATING COMPOSITION, NON-LINEAR OPTICAL MATERIAL, OPTICAL WAVEGUIDE AND LIGHT CONTROL DEVICE

(71) Applicant: ASAHI GLASS COMPANY, LIMITED, Chiyoda-ku (JP)

(72) Inventors: Eisuke Murotani, Chiyoda-ku (JP); Keiko Fukuda, Chiyoda-ku (JP); Yusuke Takahira, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 14/582,625

(22) Filed: Dec. 24, 2014

(65) Prior Publication Data

US 2015/0153509 A1    Jun. 4, 2015

Related U.S. Application Data

(63) Continuation of application No. PCT/JP2013/070514, filed on Jul. 29, 2013.

(30) Foreign Application Priority Data

Aug. 22, 2012    (JP) ................................ 2012-183074

(51) Int. Cl.
*C08G 61/02*    (2006.01)
*G02B 6/02*    (2006.01)
(Continued)

(52) U.S. Cl.
CPC ........... *G02B 6/02033* (2013.01); *C08G 65/40* (2013.01); *C08G 65/4018* (2013.01);
(Continued)

(58) Field of Classification Search
CPC . C09D 171/00; C09D 171/10; C08G 2650/40; C08G 2261/1424
See application file for complete search history.

(56) References Cited

U.S. PATENT DOCUMENTS

| 762,252 A | 6/1904 | Prescott |
| 4,915,491 A | 4/1990 | DeMartino et al. |
| 2005/0106417 A1 | 5/2005 | Casasanta, III et al. |

FOREIGN PATENT DOCUMENTS

| JP | 3-9329 | 1/1991 |
| JP | 5-93929 | 4/1993 |

(Continued)

OTHER PUBLICATIONS

International Search Report issued in corresponding PCT/JP2013/070514, mailed Oct. 22, 2013.

(Continued)

*Primary Examiner* — Shane Fang
(74) *Attorney, Agent, or Firm* — Oblon, McClelland, Maier & Neustadt, L.L.P.

(57) ABSTRACT

Provided are: a prepolymer which is capable of forming a non-linear optical material that has excellent non-linear optical effect, heat resistance, withstand voltage and transparency; a curable material which contains the prepolymer; a coating composition which contains the curable material and a solvent; a non-linear optical material which is obtained by curing the curable material; an optical waveguide which uses the non-linear optical material; and a light control device which is provided with the optical waveguide. The present invention uses a prepolymer having a crosslinkable functional group, which is obtained by reacting one or more compounds (X) that are selected from the group consisting of compounds (X1), compounds (X2) and compounds (X3), a compound (Y) that is represented by formula (Y), a (Continued)

compound (Z) that has three or more phenolic hydroxyl groups, and an organic compound (B) that exerts a nonlinear optical effect and has a reactive group.

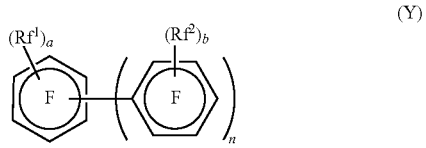

(Y)

19 Claims, 5 Drawing Sheets

(51) Int. Cl.
*C08G 65/40* (2006.01)
*G02F 1/361* (2006.01)
*G02F 1/365* (2006.01)
*G02F 1/065* (2006.01)
*G02F 1/225* (2006.01)
*C09D 179/00* (2006.01)
*G02B 6/26* (2006.01)

(52) U.S. Cl.
CPC ........... *C09D 179/00* (2013.01); *G02B 6/262* (2013.01); *G02F 1/065* (2013.01); *G02F 1/225* (2013.01); *G02F 1/361* (2013.01); *G02F 1/365* (2013.01); *C08G 2650/40* (2013.01)

(56) References Cited

FOREIGN PATENT DOCUMENTS

| JP | 2006-18157 | 1/2006 | |
|---|---|---|---|
| JP | 2008-56809 | 3/2008 | |
| JP | 2008056809 | * 3/2008 | ............ C08G 65/40 |
| JP | 2011-2793 | 1/2011 | |
| WO | 02/093249 | 11/2002 | |
| WO | 2009/137772 | 11/2009 | |
| WO | 2013/154078 | 10/2013 | |

OTHER PUBLICATIONS

C. Zhang, et al. "Low V Electrooptic Modulators from CLD-1: Chromophore Design and Synthesis, Material Processing, and Characterization", Chem. Matter, 13, pp. 3043-3050. (2001).

I. A. Young, et al. "Optical I/O Technology for Tera-Scale Computing", IEE Journal of Solid-State Circuits, vol. 45, pp. 235-248. (Jan. 2010).

Y. Enami, et al. "Hybrid polymer/sol-gel waveguide modulators with exceptionally large electro-optic coefficients", Nature Photonics, vol. 1, pp. 180-186. (Mar. 2007)

T. Ushiwata, et al. "Novel fluorine-containing second-order NLO polymers with high glass transition temperature", Optical Materials, 21, pp. 61-64. (2002).

T. Verbiest, et al. "Exceptionally Thermally Stable Polyimides for Second-Order Nonlinear Optical Applications", Science, vol. 268, pp. 1604-1606.

M. Amirkhani, et al. Second harmonic generation studies of intrinsic and extrinsic relaxation dynamics in poly(methyl methacrylate), Journal of Non-Crystalline Solids, 355, pp. 1707-1712. (2009).

Y. Enami, "Electro-Optic Polymer Modulators", The Society of Polymer Science, Japan, pp. 317-320. (2010).

S.K. Asha, et al. "Relaxation Behavior of Twin Nonlinear Optical Chromophores: Effect of the Spacer Length", Chem. Mater., 11, pp. 3352-3358. (1999).

G. Zheng, et al. "Relation in PMMA Films Doped with Aniline Derivatives for Nonlinear Optics", Polymer International, 35, 273-280. (1994).

H.W. Guan, et al. "Poling dynamics and relaxation of polar order in guest/host polymers by secondharmonic generation", J. Chem. Phys., 100, 8454. (1994).

H. L. Hampsch, et al. "Second Harmonic Generation in corona poled, doped polymer films as a function of corona processing", Journal of Applied Physics 67, 1037 (1990).

* cited by examiner

PREPOLYMER, CURABLE MATERIAL, COATING COMPOSITION, NON-LINEAR OPTICAL MATERIAL, OPTICAL WAVEGUIDE AND LIGHT CONTROL DEVICE

This application is a continuation of PCT Application No. PCT/JP2013/070514, filed on Jul. 29, 2013, which is based upon and claims the benefit of priority from Japanese Patent Application No. 2012-183074 filed on Aug. 22, 2012. The contents of those applications are incorporated herein by reference in their entireties.

TECHNICAL FIELD

The present invention relates to a prepolymer from which a nonlinear optical material can be formed, a curable material containing the prepolymer, a coating composition containing the curable material and a solvent, a nonlinear optical material obtained by curing the curable material, an optical waveguide using the nonlinear optical material, and a light control device comprising the optical waveguide.

BACKGROUND ART

As a light control device utilizing a nonlinear optical effect, an optical modulator, an optical switch, etc. have been known. The nonlinear optical effect is a phenomenon showing a nonlinear relation between the electric polarization caused when a strong electric field (optical electric field) is applied to a substance, and the electric field applied. A nonlinear optical material is a material which remarkably shows such nonlinearity.

As a nonlinear optical material utilizing a quadratic nonlinear response, a material which causes second harmonic generation (SHG) or a material which causes Pockels effect (linear electro-optic effect) which produces a change in the refractive index proportionally to the electric field, i.e. an electro-optic effect (EO effect) and the like have been known.

As a nonlinear optical material to be used for the light control device, a nonlinear optical material (a so-called electro-optic polymer) in which an organic compound which develops a nonlinear optical effect is dispersed and oriented by an electric field orientation treatment in a matrix of an organic polymer, has attracted attention in view of easiness of a process for producing a light control device, and easiness of an increase in the area.

The nonlinear optical material is required to have the following properties (i) to (iv).

(i) It is excellent in the nonlinear optical effect.

(ii) The glass transition temperature (Tg) of its matrix is sufficiently high, that is, it is a material excellent in the heat resistance, since if Tg of the matrix is low, orientation of an organic compound to develop a nonlinear optical effect, which is forcibly oriented, is relaxed, and the nonlinear optical effect will be decreased.

(iii) When an organic compound to develop a nonlinear optical effect is oriented in the matrix by electric field orientation treatment, the material is more excellent in the nonlinear optical effect as the voltage applied is higher. If the dielectric voltage of the material is low, short circuiting will occur at the time of the electric field orientation treatment. Thus, the nonlinear optical material is a material having a high dielectric voltage.

(iv) It is excellent in the transparency at a wavelength used (1.3 μm band or 1.5 μm band), in view of small optical transmission loss.

Heretofore, a host-guest nonlinear optical material has been developed, since its material is easily available and it is easily produced. A host-guest nonlinear optical material may be produced by dispersing a compound (guest) having nonlinear optical properties in an optically transparent matrix (host). As the matrix, a polymethacrylate (PMMA) has been actively studied.

However, in a host-guest nonlinear optical material, guest molecules are merely dispersed and there is no bond nor interaction with the matrix, whereby orientation of the guest molecules is thermally unstable and is easily relaxed (Non-Patent Document 1).

Accordingly, it has been studied to suppress relaxation of orientation by bonding the guest molecules to the matrix to limit free movement of the guest molecules. For example, it has been studies to bond the guest molecules to PMMA by a covalent bond (Patent Document 1).

However, the nonlinear optical material the matrix of which is PMMA has a substantial problem such that if it is left to stand at a temperature less than about 100° C. after the electric field orientation treatment, the quadratic nonlinear response will be impaired (FIG. 2 in Non-Patent Document 2, FIG. 4 in Non-Patent Document 3, FIG. 3 in Non-Patent Document 4, FIG. 2 in Non-Patent Document 5). Further, since Tg of PMMA is so low as about 100° C., the process temperature after the electric field orientation treatment is limited to be less than about 100° C. The nonlinear optical material the matrix of which is PMMA has an insufficient dielectric voltage. Further, since PMMA has many C—H bonds, its transparency in 1.3 μm band and 1.5 μm band is insufficient.

As a nonlinear optical material of which the orientation relaxation is suppressed, a nonlinear optical material having a structure to develop a nonlinear optical effect in side chains of a polyimide having high heat resistance has been proposed (Non-Patent Document 6). Further, a nonlinear optical material having crosslinks by Diels-Alder reaction introduced to the matrix has been proposed (Non-Patent Documents 7 and 8).

As a nonlinear optical material which is highly transparent in 1.3 μm band and 1.5 μm band, a material the matrix of which is made of an amorphous fluorinated polymer has been proposed (Patent Document 2).

A nonlinear optical material having a structure to develop a nonlinear optical effect in side chains of a matrix containing fluorine has been proposed (Non-Patent Document 9).

PRIOR ART DOCUMENTS

Patent Documents

Patent Document 1: U.S. Pat. No. 4,915,491
Patent Document 2: JP-A-3-9329

Non-Patent Documents

Non-Patent Document 1: J. Appl. Phys., 1990, vol. 67, p. 1037
Non-Patent Document 2: J. Chem. Phys., 1994, vol. 100(11), p. 8454-8462
Non-Patent Document 3: Polymer International, 1994, vol. 35, p. 273-280
Non-Patent Document 4: Chem. Mater., 1999, vol. 11, p. 3352-3358

Non-Patent Document 5: Journal of Non-Crystalline Solids, 2009, vol. 355, p. 1707-1712
Non-Patent Document 6: Science, 1995, vol. 268, p. 1604
Non-Patent Document 7: KOBUNSHI (Polymers, Japan), 2010, vol. 59, May issue, p. 317
Non-Patent Document 8: Nat. Photonics, 2007, vol. 1, p. 180
Non-Patent Document 9: Optical Materials, 2002, vol. 21, p. 61

DISCLOSURE OF INVENTION

Technical Problem

The nonlinear optical material as disclosed in Non-Patent Document 6 has such problems that since the structure to develop a nonlinear optical effect is required to withstand high temperature process for imidization reaction, the structure to develop a nonlinear optical effect is restricted, and the structure to develop a nonlinear optical effect can hardly be introduced at a high concentration. Further, since a polyimide has many C—H bonds, its transparency in 1.3 µm band and 1.5 µm band is low.

The nonlinear optical material as disclosed in each of Non-Patent Documents 7 and 8 is insufficient in the heat resistance, and its transparency in 1.3 µm band and 1.5 µm is low since the polymer of the matrix has many C—H bonds.

The nonlinear optical material as disclosed in Patent Document 2 has a problem of orientation relaxation since an amorphous fluorinated polymer has low Tg. Further, an amorphous fluorinated polymer is not sufficient in the compatibility with the compound to develop a nonlinear optical effect, and phase separation of the compound to develop a nonlinear optical effect may occur in the matrix.

The nonlinear optical material as disclosed in Non-Patent Document 9 is insufficient in the heat resistance since the matrix does not have crosslinkable functional group.

The object of the present invention is to provide a prepolymer from which a nonlinear optical material excellent in the nonlinear optical effect, the heat resistance, the dielectric voltage and the transparency can be formed, a curable material containing the prepolymer, a coating composition containing the curable material and a solvent, a nonlinear optical material obtained by curing the curable material, an optical waveguide using the nonlinear optical material, and a light control device comprising the optical waveguide.

Solution to Problem

The present invention provides a prepolymer, a curable material, a coating composition, a nonlinear optical material, an optical waveguide and a light control device of the following [1] to [14].
[1] A prepolymer having crosslinkable functional groups, comprising a condensate formed by a reaction including at least a dehydrohalogenation condensation reaction of the following compound (X), the following compound (Y), the following compound (Z) and the following organic compound (B):
compound (X): at least one compound selected from the group consisting of a compound (X1) having a crosslinkable functional group and a phenolic hydroxy group, a compound (X2) having a crosslinkable functional group and a fluorine atom-substituted aromatic ring, and having no phenolic hydroxy group nor aromatic ring substituted by a haloalkyl group having at most 8 carbon atoms, and a compound (X3) having a crosslinkable functional group and an aromatic ring substituted by a haloalkyl group having at most 8 carbon atoms and having no phenolic hydroxy group;
compound (Y): a compound represented by the following formula (Y);
compound (Z): a compound having at least 3 phenolic hydroxy groups and having no crosslinkable functional group; and
organic compound (B): an organic compound developing a nonlinear optical effect and having a reactive group;

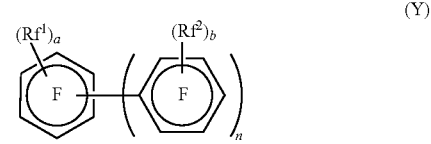

wherein n is an integer of from 0 to 3, each of a and b which are independent of each other, is an integer of from 0 to 3, each of $Rf^1$ and $Rf^2$ which are independent of each other, is a fluoroalkyl group having at most 8 carbon atoms, a nitrile group or a nitro group, and F in the aromatic ring represents that all the hydrogen atoms of the aromatic ring are substituted by a fluorine atom.
[2] The prepolymer according to [1], which is a prepolymer (C1) obtained by reacting the organic compound (B) with a fluorinated polyarylene ether prepolymer (A1) obtained by subjecting the compound (X), the compound (Y) and the compound (Z) to a condensation reaction in the presence of a dehydrohalogenating agent.
[3] The prepolymer according to [1], which is a prepolymer (C2) obtained by reacting the organic compound (B) and the compound (X) with a fluorinated polyarylene ether prepolymer (A2) obtained by subjecting the compound (Y) and the compound (Z) to a condensation reaction in the presence of a dehydrohalogenating agent.
[4] The prepolymer according to [1], which is a prepolymer (C3) obtained by reacting the organic compound (B) and the compound (X) with a fluorinated polyarylene ether prepolymer (A1) obtained by subjecting the compound (X), the compound (Y) and the compound (Z) to a condensation reaction in the presence of a dehydrohalogenating agent.
[5] The prepolymer according to [1], which is a prepolymer (C4) obtained by reacting the compound (X) to a fluorinated polyarylene ether prepolymer (A3) obtained by subjecting the compound (Z) and the organic compound (B) to a condensation reaction in the presence of a dehydrohalogenating agent to obtain a condensate, and further subjecting the compound (Y) to a condensation reaction with the obtained condensate in the presence of a dehydrohalogenating agent.
[6] The prepolymer according to any one of [1] to [5], wherein the organic compound (B) has a second order molecular hyperpolarizability of at least $10^{-30}$ esu.
[7] The prepolymer according to any one of [1] to [6], wherein the organic compound (B) is a compound having a structure such that an electron-withdrawing group and an electron-donating group are bridged by a π electron conjugated system.
[8] The prepolymer according to any one of [1] to [7], wherein the reactive group in the organic compound (B) is a group selected from the group consisting of a hydroxy group, a mercapto group, an amino group, a vinyl(oxy) group, an allyl(oxy) group, an epoxy group, a maleimide group, an azide group, an isocyanate group, a methacryloyl(oxy) group, an acryloyl(oxy) group, a trifluorovinyl(oxy) group, an ethynyl group, a 1-oxocyclopenta-2,5-dien-3-yl group, a diarylhydroxymethyl group, a hydroxyfluorenyl group, a halogenated aromatic ring, a cyclobutalene ring and an oxirane ring.

[9] The prepolymer according to any one of [1] to [8], wherein the proportion of units derived from the organic compound (B) to the total number of moles of units derived from the compound (X), units derived from the compound (Y), units derived from the compound (Z) and the units derived from the organic compound (B) is from 1 to 60 mol %.

[10] A curable material comprising the prepolymer as defined in any one of [1] to [9].

[11] A coating composition comprising the curable material as defined in [10] and a solvent (S).

[12] A nonlinear optical material, which is a cured product of the curable material as defined in [10], wherein units derived from the organic compound (B) in the cured product are oriented.

[13] An optical waveguide, of which either one or both of a core and a clad is made of the nonlinear optical material as defined in [12].

[14] A light control device, which comprises the optical waveguide as defined in [13], and electrodes to apply a voltage to the nonlinear optical material.

Advantageous Effects of Invention

From the prepolymer, the curable material and the coating composition of the present invention, a nonlinear optical material excellent in the nonlinear optical effect, the heat resistance, the dielectric voltage and the transparency can be formed.

The nonlinear optical material of the present invention is excellent in the nonlinear optical effect, the heat resistance, the dielectric voltage and the transparency.

The optical waveguide and the light control device of the present invention are capable of developing a sufficient nonlinear optical effect with a low voltage and maintaining the nonlinear optical effect for a long time, and have a small optical transmission loss.

DESCRIPTION OF EMBODIMENTS

Figure 1:
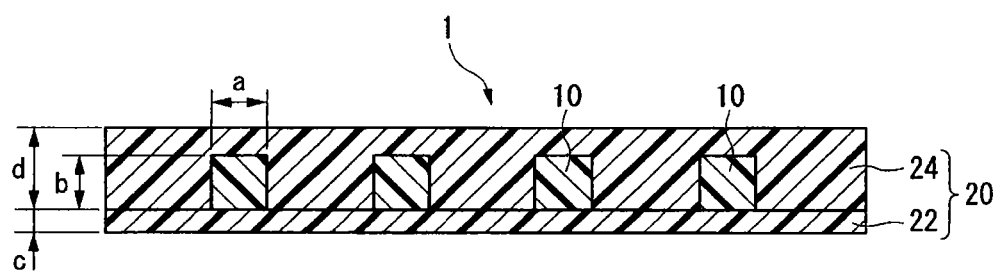
FIG. 1 is a cross-sectional view illustrating an example of an optical waveguide of the present invention.

In this specification, a compound represented by the formula (Y) will be referred to as compound (Y). The same applies to compounds represented by the other formulae.

In this specification, "a fluoroalkyl group" is a group having some of or all the hydrogen atoms in an alkyl group substituted by a fluorine atom, and "a perfluoroalkyl group" is a group having all the hydrogen atoms in an alkyl group substituted by a fluorine atom.

In this specification, a methacryloyl(oxy) group means a methacryloyl group or a methacryloyloxy group. The same applies to an acryloyl(oxy) group, a vinyl(oxy) group, an allyl(oxy) group and a trifluorovinyl(oxy) group.

In this specification, the number average molecular weight is a number average molecular weight as calculated as polystyrene obtained by measurement by gel permeation chromatography using an analytical curve prepared by using a standard polystyrene sample having a known molecular weight.

In this specification, "a unit" in a condensate, a prepolymer, a cured product or the like is a moiety derived from one molecule of a polymerizable compound such as an addition-polymerizable compound or a condensation-polymerizable compound, formed by polymerization of such a polymerizable compound. "The unit" may be one having a structure directly formed from the polymerizable compound by polymerization or may be one having a structure different from the structure directly formed from the polymerizable compound by chemical conversion. Further, a moiety constituting a terminal or a side chain of a polymer chain, formed from a monofunctional compound, will also be referred to as "a unit".

In this specification, "a condensate" means a product formed by a dehydrohalogenation condensation reaction, and may have a bond formed by a reaction other than the dehydrohalogenation condensation reaction.

In this specification "a cured product" is one obtained by curing the after-mentioned curable material, and "a nonlinear optical material" is a material which is a cured product of the curable material, in which units derived from the organic compound (B) are oriented.

[Prepolymer Having Crosslinkable Functional Groups]

The prepolymer having crosslinkable functional groups (hereinafter sometimes referred to as "prepolymer (C)") of the present invention comprises a condensate formed by a reaction including at least a dehydrohalogenation condensation reaction of the compound (X), the compound (Y), the compound (Z) and the organic compound (B).

The dehydrohalogenation condensation reaction is a reaction between a carbon atom bonded to a halogen atom (fluorine atom, a chlorine atom or a bromine atom) of an alkyl group having a fluorine atom or a bromine atom or a compound having a fluorine atom-substituted aromatic ring, and a phenolic hydroxy group of a compound having a phenolic hydroxy group. By this reaction, a carbon-oxygen bond is formed and the two compounds are bonded. In a case where the halogen atom-containing compound has at least two carbon atoms bonded to a halogen atom and the phenolic hydroxy group-containing compound has at least two phenolic hydroxy groups, these compounds are polymerized by the condensation reaction. A prepolymer which is a condensate having a polymer chain constituted by units of these compounds forms.

The compound (Y) is a halogen atom-containing compound having at least two such carbon atoms bonded to a halogen atom, and the compound (Z) is a phenolic hydroxy group-containing compound having at least three such phenolic hydroxy groups. Accordingly, the compound (Y) and the compound (Z) are condensed to form a prepolymer.

The carbon atom of the carbon-oxygen bond formed by condensation of the compound (Y) and the compound (Z) is a carbon atom constituting the aromatic ring. By the oxygen atom of the carbon-oxygen bond being an oxygen atom bonded to the carbon atom constituting the aromatic ring, an arylene ether structure is formed between two molecules of these compounds. Also in the case of the compound (X) having a phenolic hydroxy group or a fluorine atom-substituted aromatic ring, an arylene ether structure is formed by the condensation reaction with the compound (Y) or the compound (Z). Thus, the prepolymer (C) is a prepolymer having an arylene ether structure.

The compound (X) is a compound having the above carbon atom bonded to a halogen atom or phenolic hydroxy group, and may be a compound having one carbon atom bonded to a halogen atom or phenolic hydroxy group. In a case where the compound (X) has at least two carbon atoms bonded to a halogen atom or at least two phenolic hydroxy groups, the compound (X) may be condensed with the compound (Y) or the compound (Z) to form a prepolymer. In a case where the compound (X) is a monofunctional compound having one carbon atom bonded to a halogen atom or phenolic hydroxy group, such a monofunctional compound (X) forms a unit incorporated in the terminal or the side chain of a polymer chain formed by condensation of the compound (Y) and the compound (Z).

Further, the organic compound (B) may be a compound having a carbon atom bonded to a halogen atom or may be a compound having a phenolic hydroxy group. In such a case, the number of the carbon atom bonded to a halogen atom or the phenolic hydroxy group in the organic compound (B) may be one. Such an organic compound (B) forms a unit constituting a polymer chain of the prepolymer or a unit incorporated in the terminal or the side chain of the polymer chain, in the same manner as the compound (X), at a stage of production of the prepolymer (C).

Further, the compound (X) is a compound having a crosslinkable functional group, whereas the compound (Y) and the compound (Z) are compounds having no crosslinkable functional group. When the compound (X) is condensed with the compound (Y) or the compound (Z), by preventing the crosslinkable functional group from being reacted, a prepolymer having a crosslinkable functional group is obtained. The crosslinkable functional group does not undergo reaction by the dehydrohalogenation condensation reaction. Accordingly, in a case where the prepolymer (C) is produced only by a reaction in which the crosslinkable functional group does not undergo reaction, such as the dehydrohalogenation condensation reaction, the number of the crosslinkable functional groups in the prepolymer (C) is proportional to the number of units derived from the compound (X) in the prepolymer (C).

The organic compound (B) is an organic compound which has a structure to develop a nonlinear optical effect and further has a reactive group. The reactive group in the organic compound (B) is a reactive group necessary for the organic compound (B) to be incorporated in the prepolymer (C) in the process for formation of the prepolymer (C). Such a reactive group may, for example, be a reactive group capable of being bonded to at least one of the compound (X), the compound (Y) and the compound (Z), or a reactive group capable of being bonded to a reactive group which a condensate of at least two compounds selected from the compound (X), the compound (Y) and the compound (Z) has. More specifically, it may be the above-mentioned carbon atom bonded to a halogen atom or phenolic hydroxy group.

The reactive group may be a reactive group capable of being bonded by a reaction other than the dehydrohalogenation condensation reaction. It may, for example, be a group to form a covalent bond by reaction with the crosslinkable functional group of the compound (X), or a group forming a covalent bond by reaction with the phenolic hydroxy group of the compound (Z) or the like by a reaction other than the dehydrohalogenation condensation reaction. However, in a case of the group forming a covalent bond by reaction with the crosslinkable functional group, the amount of the organic compound (B) having such a group used must not be an amount so large that the formed prepolymer (C) does not have crosslinkable functional groups. In a case of the group forming a covalent bond by reaction with the phenolic hydroxy group, the amount of the organic compound (B) having such a group used must not be an amount so large as to inhibit formation of the prepolymer (C) from the compound (Z) and the like.

Further, in a case where the compound (X), the compound (Y) or the compound (Z) has a functional group which is not a crosslinkable functional group and which is not involved in the dehydrohalogenation condensation reaction, the reactive group may be a group forming a covalent bond by reaction with such a functional group.

As mentioned above, in production of the prepolymer (C), the crosslinkable functional group which a prepolymer (e.g. the after-mentioned prepolymer (A1)) having units derived from the compound (X) has or the crosslinkable functional group which the compound (X) has, and the reactive group of the organic compound (B), may be reacted to incorporate the unit of the organic compound (B) into the prepolymer (C). In such a case, the crosslinkable functional groups are consumed in the process of production of the prepolymer (C), and the number of the crosslinkable functional groups in the prepolymer (C) is not proportional to the number of units derived from the compound (X) in the prepolymer (C) and is relatively decreased.

(Compound (X))

The compound (X) is a compound selected from the group consisting of a compound (X1) having a crosslinkable functional group and a phenolic hydroxy group, a compound (X2) having a crosslinkable functional group and a fluorine atom-substituted aromatic ring and having no phenolic hydroxy group nor aromatic ring substituted by a haloalkyl group having at most 8 carbon atoms, and a compound (X3) having a crosslinkable functional group and an aromatic ring substituted by a haloalkyl group having at most 8 carbon atoms and having no phenolic hydroxy group, and for production of the prepolymer (C), at least one of these compounds is used.

The compound (X) is used to introduce the crosslinkable functional group to the prepolymer (C).

A crosslinkable functional group is a functional group which does not substantially undergo reaction in the dehydrohalogenation condensation reaction at the time of production of the prepolymer (C), which is reacted by imparting an external energy (such as heat, light (actinic rays) or electron beams) and causes polymerization by crosslinking between molecules of the prepolymer (C) or chain extension. As mentioned above, some of the crosslinkable functional groups may be used for reaction with the reactive group of the compound (B) at the time of production of the prepolymer (C).

The crosslinkable functional group contained in the prepolymer (C) may, for example, be specifically a vinyl(oxy) group, an allyl(oxy) group, an epoxy group, a maleimide group, an azide group, an isocyanate group, an acryloyl(oxy) group, a methacryloyl(oxy) group, a trifluorovinyl(oxy) group, an ethynyl group, a methylethynyl group, an ethylethynyl group, a propylethynyl group, a n-butylethynyl group, a tert-butylethynyl group, a phenylethynyl group, a 1-oxocyclopenta-2,5-dien-3-yl group, a diarylhydroxymethyl group, a hydroxyfluorenyl group, a cyclobutalene group or an oxirane group. In view of high reactivity and with a view to obtaining a high crosslink density, preferred is a crosslinkable functional group selected from the group consisting of a vinyl(oxy) group, an allyl(oxy) group, an acryloyl(oxy) group, a methacryloyl(oxy) group, an ethynyl group, a tert-butylethynyl group and a phenylethynyl group, and in view of excellent heat resistance of a cured product, particularly preferred is a vinyl group, an ethynyl group or a phenylethynyl group.

A single type or at least two types of the crosslinkable functional groups may be contained in the prepolymer (C).

The amount of the compound (X) used at the time of production of the prepolymer (C) is set depending upon the desired content of the crosslinkable functional groups in the prepolymer (C). Further, in a case where some of the crosslinkable functional groups are used for reaction with the reactive group of the compound (B) at the time of production of the prepolymer (C), the amount of the compound (X) used is set depending upon the loss of the crosslinkable functional groups by the reaction and the desired content of the crosslinkable functional groups in the prepolymer (C).

The content of the crosslinkable functional groups in the prepolymer (C) is preferably from 0.1 to 4 millimole, particularly preferably from 0.2 to 3 millimole per 1 g of the prepolymer (C). When the content of the crosslinkable functional groups is at most the upper limit of the above range, the resulting cured product and nonlinear optical material will not be highly brittle, and will be excellent in toughness. When the content of the crosslinkable functional groups is at least the lower limit of the above range, the resulting cured product and nonlinear optical material will be excellent in the heat resistance and the solvent resistance.

<Compound (X1)>

The compound (X1) is a compound having a crosslinkable functional group and a phenolic hydroxy group.

The compound (X1) is preferably a compound (X11) having a crosslinkable functional group and one phenolic hydroxy group, or a compound (X12) having a crosslinkable functional group and two phenolic hydroxy groups. Further, the crosslinkable functional group contained in the compound (X1), the compound (X11) and the compound (X12) is the crosslinkable functional group contained in the above prepolymer (C), and its specific examples and preferred examples are the same.

The compound (X1) may be used alone or in combination of two or more.

The compound (X11) may, for example, be specifically a phenol having a vinyl group, an allyl group, a vinyloxy group, a maleimide group, an allyl(oxy) group, an acryloyl(oxy) group or a methacryloyl(oxy) group (such as 4-hydroxystyrene), or an ethynylphenol (such as 3-ethynylphenol, 4-phenylethynylphenol or 4-(4-fluorophenyl)ethynylphenol).

The compound (X11) may be used alone or in combination of two or more.

The compound (X12) may, for example, be specifically a bis(phenylethynyl)dihydroxybiphenyl (such as 2,2'-bis(phenylethynyl)-5,5'-dihydroxybiphenyl or 2,2'-bis(phenylethynyl)-4,4'-dihydroxybiphenyl) or a dihydroxydiphenylacetylene (such as 4,4'-dihydroxytolane or 3,3'-dihydroxytolane).

The compound (X12) may be used alone or in combination of two or more.

The phenolic hydroxy group in the compound (X1) may be formed in the reaction system. Specifically, the phenolic hydroxy group in the compound (X1) includes a phenolic hydroxy group having a protective group which is left in the presence of an alkali to form a phenolic hydroxy group. Further, the compound (X1) includes a compound such as an ester, which gives a phenolic hydroxy group in the presence of a dehydrofluorinating agent. For example, a compound having an acyloxy group (such as 4-acetoxystyrene or 3-ethynylacetoxybenzene) instead of the phenolic hydroxy group in the compound (X1) may be used.

<Compound (X2)>

The compound (X2) is a compound having a crosslinkable functional group and a fluorine atom-substituted aromatic ring and having no phenolic hydroxy group nor aromatic ring substituted by a haloalkyl group having at most 8 carbon atoms.

The compound (X2) is preferably a compound (X21) having a perfluoroaromatic ring (such as perfluorophenyl or perfluorobiphenyl) as the fluorine atom-substituted aromatic ring. Further, the crosslinkable functional group contained in the compound (X2) and the compound (X21) is the crosslinkable functional group contained in the above prepolymer (C), and its specific examples and preferred examples are the same.

The compound (X2) may be used alone or in combination of two or more.

The compound (X21) may, for example, be specifically a fluorinated aryl having a vinyl(oxy) group, an allyl(oxy) group, a maleimide group, an acryloyl(oxy) group or a methacryloyl(oxy) group (such as pentafluorostyrene, pentafluorobenzyl acrylate, pentafluorobenzyl methacrylate, pentafluorophenyl acrylate, pentafluorophenyl methacrylate, perfluorostyrene, pentafluorophenyl trifluorovinyl ether, 3-(pentafluorophenyl)pentafluoropropene-1, or N-pentafluorophenylmaleimide), a fluorinated arylacetylene (such as pentafluorophenylacetylene or nonafluorobiphenylacetylene), or a fluorinated diarylacetylene (such as phenylethynylpentafluorobenzene, phenylethynylnonafluorobiphenyl or decafluorotolane), and from such a viewpoint that the crosslink reaction proceeds at a relatively low temperature, and a cured product and a nonlinear optical material of the obtainable prepolymer (C) are excellent in the heat resistance, preferred is a fluorinated arylacetylene.

<Compound (X3)>

The compound (X3) is a compound having a crosslinkable functional group and an aromatic ring substituted by a haloalkyl group having at most 8 carbon atoms, and having no phenolic hydroxy group. The halogen atom in the haloalkyl group is a chlorine atom or a bromine atom.

The compound (X3) is preferably a compound (X31). The crosslinkable functional group contained in the compound (X3) and the compound (X31) is the crosslinkable functional group contained in the above prepolymer (C), and its specific examples and preferred examples are the same.

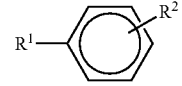

(X31)

$R^1$ is a monovalent organic group having a crosslinkable functional group and having no phenolic hydroxy group. It may have a single bond or a bivalent organic group (such as an alkylene group or an arylene group) between the crosslinkable functional group and the aromatic ring.

R² is a haloalkyl group having at most 8 carbon atoms, preferably a haloalkyl group represented by —R³—X, wherein R³ is an alkylene group having at most 8 carbon atoms (preferably at most 4 carbon atoms), and X is a chlorine atom or a bromine atom.

The compound (X3) is preferably chloromethylstyrene, chloroethylstyrene, chloropropylstyrene or bromomethylstyrene, particularly preferably chloromethylstyrene, in view of high reactivity of the crosslinkable functional group and a low curing temperature of the prepolymer (C).

The compound (X3) may be used alone or in combination of two or more.

(Compound (Y))

The compound (Y) is a compound represented by the following formula (Y):

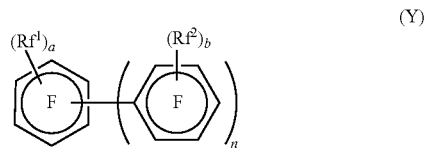

wherein n is an integer of from 0 to 3, each of a and b which are independent of each other, is an integer of from 0 to 3, each of Rf¹ and Rf² which are independent of each other, is a fluoroalkyl group having at most 8 carbon atoms, a nitrile group or a nitro group, and F in the aromatic ring represents that all the hydrogen atoms of the aromatic ring are substituted by a fluorine atom.

Each of a and b which are independent of each other, is 0 to 3, and since production of the compound (Y) is difficult if the number of Rf¹ and Rf² is large, it is preferably from 0 to 2, particularly preferably 0.

Each of Rf¹ and Rf² which are independent of each other, is a fluoroalkyl group having at most 8 carbon atoms, a nitrile group or a nitro group.

The fluoroalkyl group having at most 8 carbon atoms is preferably a perfluoroalkyl group having at most 8 carbon atoms in view of the heat resistance, and may, for example, be specifically a perfluoromethyl group, a perfluoroethyl group, a perfluoropropyl group, a perfluorobutyl group, a perfluorohexyl group or a perfluorooctyl group.

The compound (Y) may be, in a case where n=0, perfluorobenzene, perfluorotoluene, perfluoroxylene, perfluorobenzonitrile or perfluoronitrobenzene. In a case where n=1, it may, for example, be perfluorobiphenyl. In a case where n=2, it may, for example, be perfluoroterphenyl. In a case where n=3, it may, for example, be perfluoro(1,3,5-triphenylbenzene) or perfluoro(1,2,4-triphenylbenzene). Preferred is perfluorobenzene or perfluorobiphenyl, and from such a viewpoint that the obtainable cured product and nonlinear optical material are excellent in the dielectric voltage and the heat resistance and are excellent in the flexibility, particularly preferred is perfluorobiphenyl.

The compound (Y) may be used alone or in combination of two or more.

(Compound (Z))

The compound (Z) is a compound having at least 3 phenolic hydroxy groups and having no crosslinkable functional group.

The compound (Z) is preferably a polyfunctional phenol, from such a viewpoint that the obtainable prepolymer (C) is rigid, and the obtainable cured product and nonlinear optical material are excellent in the heat resistance. The number of the phenolic hydroxy groups in the compound (Z) is practically preferably from 3 to 6, particularly preferably from 3 to 4.

The compound (Z) may, for example, be specifically trihydroxybenzene, trihydroxybiphenyl, trihydroxynaphthalene, 1,1,1-tris(4-hydroxyphenyl)ethane, 1,1,2,2-tetrakis(4-hydroxyphenyl)ethane, tris(4-hydroxyphenyl)benzene, tetrahydroxybenzene, tetrahydroxybiphenyl, tetrahydroxybinaphthyl or tetrahydroxyspiroindan. In view of availability and from such a viewpoint that the obtainable cured product and nonlinear optical material are excellent in the heat resistance, particularly preferred is trihydroxybenzene, 1,1,1-tris(4-hydroxyphenyl)ethane or 1,1,2,2-tetrakis (4-hydroxyphenyl)ethane.

The compound (Z) may be used alone or in combination of two or more.

(Organic Compound (B))

The organic compound (B) is an organic compound developing a nonlinear optical effect and having a reactive group.

In order that the nonlinear optical material of the present invention sufficiently develops a nonlinear optical effect, the second order molecular hyperpolarizability of the organic compound (B) which develops a nonlinear optical effect, the dipole moment of the organic compound (B), the polarization voltage at the time of the electric field orientation treatment, and the content of units derived from the organic compound (B) contained in the prepolymer (C) are important.

The organic compound (B) is preferably a compound having a second order molecular hyperpolarizability of at least $10^{-30}$ esu. The second order hyperpolarizability is an index representing the optical nonlinearity per molecule and can be estimated from the following formula (1):

$$\beta_{CT} = \frac{3}{2m}\left(\frac{h}{2\pi}\right)^2 \frac{Wf\delta}{(W^2 - W_{in}^2)(W^2 - 4W_{in}^2)} \quad (1)$$

wherein $\beta_{CT}$ is the second order molecular hyperpolarizability, h is the Plank's constant, m is the mass of electron, W is the energy difference between two levels, $W_{in}$ is the energy of incident light, f is the oscillator strength, and δ is the dipole moment difference between two levels.

The second order molecular hyperpolarizability may be actually measured by Solvatochromic method (SC method) (J. Org. Chem., 1989, Vol. 54, p. 3774), EFISH method (J. Chem. Phys., 1977, Vol. 66, p. 2664) or hyper Rayleigh scattering method (HRS method). Further, it is possible to computationally obtained the second order molecular hyperpolarizability as in PPP-MO method as disclosed in JP-A-5-93929.

The second order molecular hyperpolarizability in the present invention is a value determined by the HRS method.

As a structure to increase the second order molecular hyperpolarizability and the dipole moment of the organic compound (B), preferred is a structure in which an electron-withdrawing group and an electron-donating group are bridged by a π electron conjugate system.

The electron-withdrawing group may, for example, be a nitro group, a cyano group, a dicyanovinyl group, a tricyanovinyl group or a tricyanofuran group (2-dicyanomethylene-3-cyano-4,5,5-trimethyl-2,5-dihydrofuran).

The electron-donating group may, for example, be an amino group, an alkylamino group, a dialkylamino group, a diarylamino group, an alkoxy group, a halogen atom, a mercapto group, a hydroxy group or a thioether group.

The π electron conjugated system may, for example, be an aromatic ring (such as a benzene ring, a naphthalene ring or a phenanthrene ring), a π electron conjugated heterocyclic ring (such as a thiophene ring, a furan ring, a pyridine ring or a thiazole ring), a combination of the aromatic ring and/or the π electron conjugated heterocyclic ring and an unsaturated bond (such as >C=C<, —N=N—, —C≡C—, or >C=N—) or repetition of an unsaturated bond.

The reactive group contained in the organic compound (B) is a reactive group to incorporate the organic compound (B) in the prepolymer (C) as mentioned above and may, for example, be a group forming a covalent bond by reaction with at least one of the crosslinkable functional group, the phenolic hydroxy group and the fluorine atom-substituted aromatic ring.

The position of the reactive group in the structure of the organic compound (B) is not limited, and the reactive group may be located on any atom constituting the organic compound (B).

The reactive group may be an alcoholic or phenolic hydroxy group, a mercapto group, an amino group, a vinyl (oxy) group, an allyl(oxy) group, an epoxy group, a maleimide group, an azide group, an isocyanate group, an acryloyl (oxy) group, a methacryloyl(oxy) group, a trifluorovinyl (oxy) group, an ethynyl group, a 1-oxocyclopenta-2,5-dien-3-yl group, a diarylhydroxymethyl group, a hydroxyfluorenyl group, a halogenated aromatic ring, a cyclobutalene ring or an oxylane ring. With a view to easily controlling the reaction, preferred is a hydroxy group, a mercapto group, an amino group, an azide group or a halogenated aromatic ring. With a view to easily controlling the reaction with the phenolic hydroxy group of the compound (Z) or the like, preferred is a fluorine atom-substituted aromatic ring such as polyfluorophenyl.

As specific examples of the organic compound (B), the following compounds may be mentioned.

A compound wherein the π electron conjugated system is an aromatic ring or a π electron conjugated heterocyclic ring:

A styrene derivative (such as 4-(N,N-diethylamino)-β-nitrostyrene), an aniline derivative (such as 4-nitroaniline, 4-(N,N-diethylamino)nitrobenzene, 2-methyl-4-nitroaniline, 4-nitrophenylprolinol, 4-cyclooctylaminonitrobenzene, or N-cyanomethyl-N-methyl-4-nitroaniline), a pyridine derivative (such as 4-cyclooctylaminonitropyridine, 4-adamantaneaminonitropyridine or 2-(N-plopinol)-5-nitropyridine), a benzo heterocyclic ring derivative (such as 5-nitroindole or chloronitrobenzooxadiazole) or the like.

A compound wherein the π electron conjugated system is a combination of an aromatic ring and/or a π electron conjugated heterocyclic ring and an unsaturated bond:

a stilbene derivative (such as 4-methoxy-4'-nitrostilbene, 4-bromo-4'-nitrostilbene, 4-(N,N-dimethylamino)-4'-nitrostilbene, 4-(N,N-diethylamino)-4'-nitrostilbene, 4-(N,N-dipropylamino)-4'-nitrostilbene or 3-methyl-4-methoxy-4'-nitrostilbene), an azobenzene derivative (such as 4-(N,N-dimethylamino)-4'-nitroazobenzene, 4-(N,N-diethylamino)-4'-nitroazobenzene, the following organic compound (B-1) or the following organic compound (B-2)), a stilbazolium derivative (such as m-sulfonate salt of 4'-diethylamino-N-methyl-4-stilbazolium or iodine salt of 4'-diethylamino-N-methyl-4-stilbazolium), a benzylideneaniline derivative (terephthal-bis {(p-diethylamino)aniline}), a polyarylene vinylene derivative (such as poly(p-phenylene vinylene) or poly(2,5-thienylene vinylene)), a phenyl polyene derivative (such as compound disclosed in Chem. Mater., 2001, Vol. 13, p. 3043-3050, the following organic compound (B-3) or the following organic compound (B-4))

a pyridinium derivative disclosed in JP-A-2011-002793,
an azulenium derivative disclosed in JP-A-2011-002793,
a quinolium derivative disclosed in JP-A-2011-002793,
a compound disclosed in Chem. Mater., 2001, Vol. 13, p. 3043-3050,
a compound disclosed in United States Patent Application 2009/0137772, or the like.

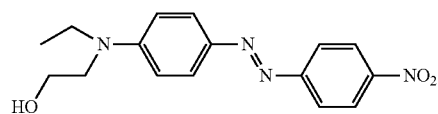

(B-1)

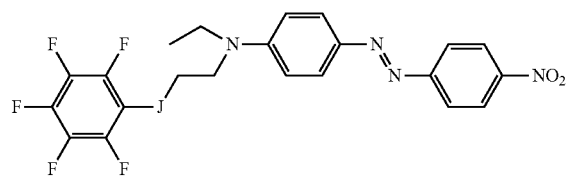

(B-2)

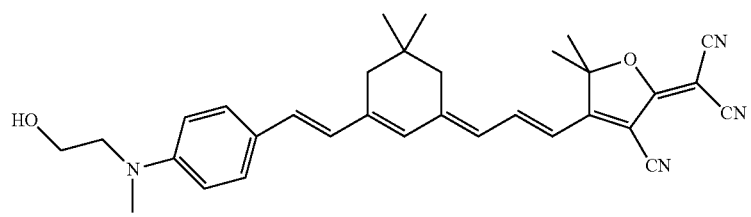

(B-3)

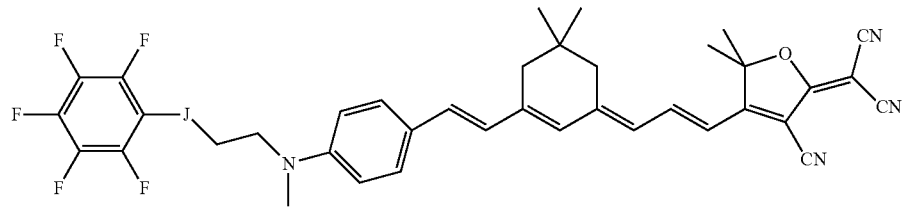

(B-4)

A compound wherein the π electron conjugated system is repetition of an unsaturated bond:
a polydiacetylene derivative,
a poly(1,4-diethynylbenzene) derivative,
a polyacetylene derivative, or the like.

The connecting portion J in the above organic compound (B-2) or (B-4) may, for example, be an ether group, a thioether group or a heterocyclic ring, and preferred is a heterocyclic ring, in view of stiffness and high heat resistance.

The heterocyclic ring may, for example, be specifically pyrrole, furan, thiophene, imidazole, pyrazole, oxazole, isoxazole, thiazole, isothiazole, pyridine, pyrimidine, pyridazine, pyrazine, 1,2,3-triazine, quinoline, isoquinoline, quinazoline, phthalazine or pteridine, coumarin, chromone, 1,4-benzodiazepine, indole, benzimidazole, benzofuran, purine, acridine, phenoxazine or phenothiazine.

The organic compounds (B-2) and (B-4) may have, in a case where the connecting portion J is 1,2,3-triazine, chemical structures of 1,4-isomer and 1,5-isomer as shown in the formulae (B-2-1) and (B-4-1).

The organic compound (B) may be any of the 1,4-isomer alone, the 1,5-isomer alone and a mixture of the 1,4-isomer and the 1,5-isomer, and in view of high linearity of the molecule and with a view to maintaining the oriented state, it preferably contains 1,4-isomer as the main component, and it particularly preferably consists of 1,4-isomer alone.

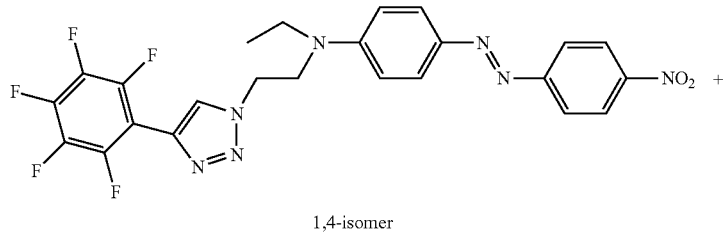

(B-2-1)

1,4-isomer

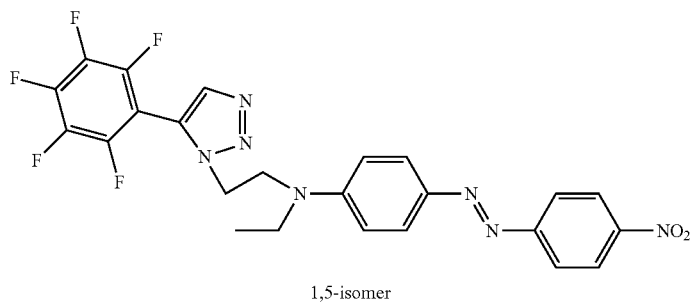

1,5-isomer

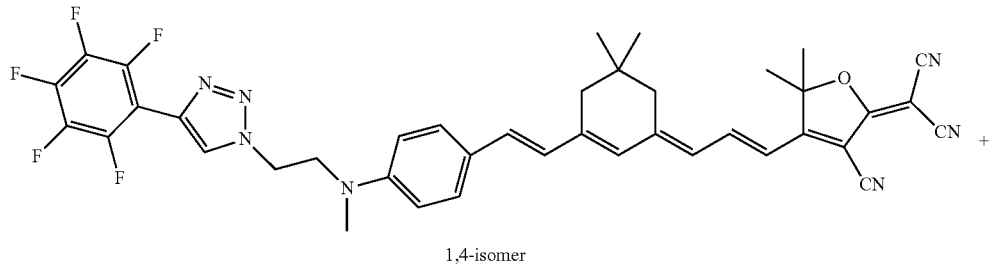

(B-4-1)

1,4-isomer

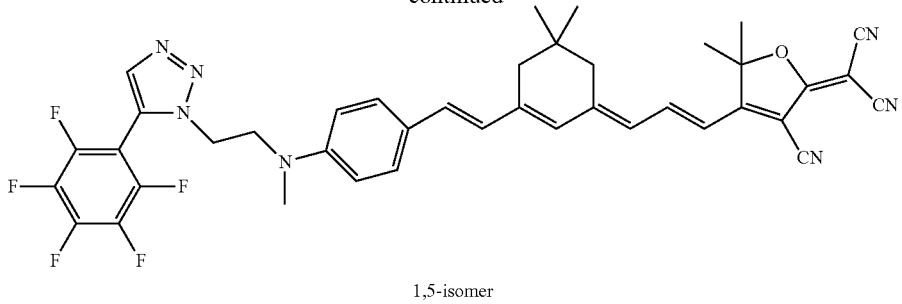

1,5-isomer

The organic compound (B-2) may have chemical structures of 1,4-isomer and 1,5-isomer. Any of the 1,4-isomer alone, the 1,5-isomer alone and a mixture of the 1,4-isomer and the 1,5-isomer may be used, and in view of high linearity of the molecule and with a view to maintaining the oriented state, the compound preferably contains the 1,4-isomer as the main component, and it particularly preferably consists of the 1,4-isomer alone.

To produce the organic compound (B-2), a known method may be employed. For example, a method disclosed in Chem. Mater., 2011, Vol. 23, p. 862 or Polym. Chem., 2011, Vol. 2, p. 157 may be employed. The compound (B-1) is reacted with methanesulfonyl chloride (MsCl) to obtain compound (b-1). Then, by nucleophilic substitution reaction of sodium azide, compound (b-2) is obtained. In the presence of a copper catalyst or under heating without a catalyst, by an addition reaction of the compound (b-2) and an alkyne compound, the organic compound (B-2) is obtained.

In view of excellent solubility, the chlorine-containing organic solvent is preferably chloroform, methylene chloride or the like.

The nonpolar solvent may, for example, be hexane or pentane, and the polar solvent may, for example, be methanol or ethanol. The mixing ratio of the nonpolar solvent and the polar solvent to each of the organic compounds (B-2) and (B-4) is preferably from 4:6 to 1:1 (volume ratio) with a view to high agglomeration yield.

The organic compound (B) may be used alone or in combination of two or more.

The amount of the organic compound (B) used at the time of production of the prepolymer (C) is set considering the content of units derived from the organic compound (B), the molar ratio of the units and the crosslinkable functional group, etc. in the prepolymer (C).

In the prepolymer (C), the proportion of units derived from the organic compound (B) to the total number of moles

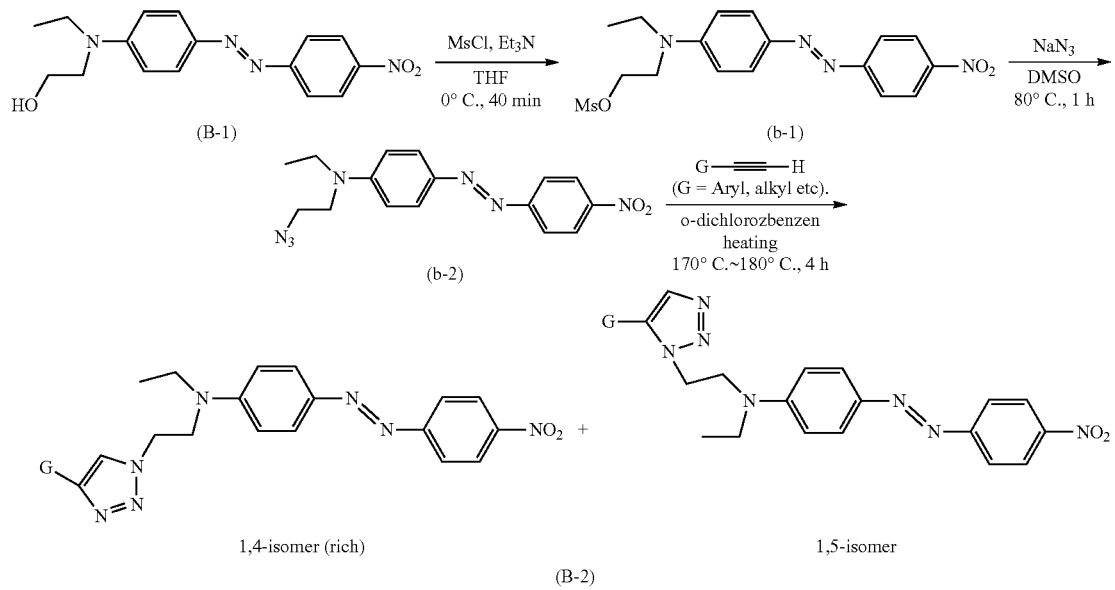

In order to improve the mixture ratio of the 1,4-isomer in the mixture of each of the organic compounds (B-2) and (B-4), preferred is a method wherein the reaction liquid is diluted with a chlorine-containing organic solvent and dropwise added to a mixed liquid of a nonpolar solvent and a polar solvent with stirring, for agglomeration. By such a method, it is possible to selectively separate the 1,4-isomer, and the purification step may be carried out in one step.

(100 mol %) of units derived from the compound (X), units derived from the compound (Y), units derived from compound (Z) and the units derived from the organic compound (B) is preferably from 1 to 60 mol %, particularly preferably from 5 to 50 mol %. When the proportion of the units derived from the organic compound (B) is at least the lower limit of the above range, the resulting nonlinear optical material has a sufficiently excellent nonlinear optical effect.

When the proportion of the units derived from the organic compound (B) is at most the upper limit of the above range, the resulting nonlinear optical material will be sufficiently excellent in the heat resistance and the dielectric voltage.

The molar ratio (units derived from the organic compound (B): crosslinkable functional groups) of the units derived from the organic compound (B) to the crosslinkable functional groups in the prepolymer (C) is preferably from 60:40 to 1:99, particularly preferably from 50:50 to 20:80.

When the proportion of the number of moles of the crosslinkable functional groups to the total number of moles of the units derived from the organic compound (B) and the crosslinkable functional groups is at most 99%, the content of the units derived from the organic compound (B) will be sufficiently secured, and when it is at least 40%, the resulting cured product and nonlinear optical material will be excellent in the heat resistance and the solvent resistance.

The prepolymer (C) which is a prepolymer having crosslinkable functional groups of the present invention is preferably the following prepolymer (C1), (C2), (C3) or (C4).

Prepolymer (C1): A prepolymer obtained by reacting the organic compound (B) with a fluorinated polyarylene ether prepolymer (A1) (hereinafter sometimes referred to as "prepolymer (A1)") obtained by subjecting the compound (X), the compound (Y) and the compound (Z) to a condensation reaction in the presence of a dehydrohalogenating agent.

Prepolymer (C2): A prepolymer obtained by reacting the organic compound (B) and the compound (X) with a fluorinated polyarylene ether prepolymer (A2) (hereinafter sometimes referred to as "prepolymer (A2)") obtained by subjecting the compound (Y) and the compound (Z) to a condensation reaction in the presence of a dehydrohalogenating agent.

Prepolymer (C3): A prepolymer obtained by reacting the organic compound (B) and the compound (X) with the prepolymer (A1).

Prepolymer (C4): A prepolymer obtained by reacting the compound (X) with a fluorinated polyarylene ether prepolymer (A3) (hereinafter sometimes referred to as "prepolymer (A3)") obtained by subjecting the compound (Z) and the organic compound (B) to a condensation reaction in the presence of a dehydrohalogenating agent to obtain a condensate, and further subjecting the compound (Y) to a condensation reaction with the obtained condensate in the presence of a dehydrohalogenating agent.

(Method for Producing Prepolymer (C1))

The prepolymer (C1) is produced by reacting the organic compound (B) with the prepolymer (A1).

<Prepolymer (A1)>

The prepolymer (A1) is a fluorinated polyarylene ether prepolymer and is produced by subjecting the compound (X), the compound (Y) and the compound (Z) to a condensation reaction in the presence of a dehydrohalogenating agent.

In the condensation reaction, an ether bond is formed e.g. by a reaction mechanism by which a phenoxy ion derived from the phenolic hydroxy group attacks the carbon atom to which a fluorine atom is bonded in the aromatic ring or the carbon atom to which a halogen atom is bonded in the haloalkyl group, and then the halogen atom leaves. Depending upon the positional relation of the aromatic ring in the condensation reaction, a dioxin skeleton may form.

In the condensation reaction, the compound (X), the compound (Y) and the compound (Z) may be reacted simultaneously, or in view of the reaction efficiency, in a case where the compound (X) and the compound (Z) are reactive with each other, the compound (X) and the compound (Z) may be reacted first, and before or after completion of the reaction, the compound (Y) is added and reacted. Further, in a case where the compound (X) and the compound (Y) are reactive with each other, the compound (X) and the compound (Y) may be reacted first, and before or after completion of the reaction, the compound (Z) is added and reacted. In a case where the compound (Y) and the compound (Z) are reactive with each other, the compound (Y) and the compound (Z) may be reacted first, and before or after completion of the reaction, the compound (X) is reacted.

The dehydrohalogenating agent is preferably a basic compound, particularly preferably a carbonate, a hydrogen carbonate, a hydroxide or an alkoxide of an alkali metal. It may, for example, be specifically sodium carbonate, potassium carbonate, sodium hydrogen carbonate, potassium hydrogen carbonate, sodium hydroxide, potassium hydroxide or potassium tert-butoxide.

The amount of the dehydrohalogenating agent used is necessarily at least 1 mole, preferably from 1.1 to 3 mole per 1 mole of the phenolic hydroxy groups of the compound (Z).

The condensation reaction conditions are preferably at 10 to 200° C. for from 1 to 80 hours, more preferably at 20 to 180° C. for from 2 to 60 hours, particularly preferably at from 40 to 160° C. for from 3 to 24 hours.

The condensation reaction is preferably carried out in a polar solvent. The polar solvent is preferably a solvent containing an aprotic polar solvent such as N,N-dimethylacetamide, N,N-dimethylformamide, N-methylpyrrolidone, dimethyl sulfoxide or sulfolane. The polar solvent may contain, within a range not to lower the solubility of the prepolymer (A1) to be formed and not to impair the condensation reaction, toluene, xylene, benzene, tetrahydrofuran, benzotrifluoride or xylene hexafluoride. By containing such a solvent, the polarity (dielectric constant) of the solvent is changed and the reaction rate can be controlled.

In order to improve the heat resistance and the flexibility of a cured product of the prepolymer (C1) and a nonlinear optical material, a co-condensation component may be added at the time of production of the prepolymer (A1).

The co-condensation component may be a compound (W) having two phenolic hydroxy groups and having no crosslinkable functional group.

The compound (W) may be a bifunctional phenol such as dihydroxybenzene, dihydroxybiphenyl, dihydroxyterphenyl, dihydroxynaphthalene, dihydroxyanthracene, dihydroxyphenanthracene, dihydroxy-9,9-diphenylfluorene, dihydroxydibenzofuran, dihydroxydiphenyl ether, dihydroxydiphenyl thioether, dihydroxybenzophenone, dihydroxy-2,2-diphenylpropane, dihydroxy-2,2-diphenylhexafluoropropane or dihydroxybinaphthyl.

The compound (W) may be used alone or in combination of two or more.

The prepolymer (A1) is purified after the condensation reaction as the case requires by a method such as neutralization, reprecipitation, extraction or filtration. The purification is carried out preferably in the presence of the polar solvent preferably used at the time of production or in a state where the prepolymer (A1) is dissolved or dispersed in the after-mentioned solvent (S) in view of a high efficiency.

The number average molecular weight of the prepolymer (A1) is preferably from 1,000 to 500,000, more preferably from 1,500 to 200,000, particularly preferably from 1,500 to 150,000. Within the above range, the prepolymer (C1) obtainable from the prepolymer (A1) and a coating composition containing the prepolymer (C1) are easily applied, and the obtainable cured product and nonlinear optical material are excellent in the heat resistance, mechanical properties and the solvent resistance.

The number average molecular weight of the prepolymer (A1) may be controlled by the proportion of the total amount of the compound (X) and the compound (Y) to the compound (Z) charged.

Here, it is preferred that no hydroxy group remain in the prepolymer (A1), in view of favorable transparency of the resulting cured product and nonlinear optical material in the 1.3 μm band or 1.5 μm band. In the condensation reaction, the compound (Y) usually functions as a bifunctional compound. Accordingly, it is preferred to adjust the molecular weight within a range where the total number of moles of the hydroxy groups of the compound (Z) and the compound (X1) does not exceed the sum of twice the number of moles of the compound (Y), the number of moles of the compound (X2) and the number of moles of the compound (X3).

Specifically, for example, in a case where the compound (X1), the compound (Y) and the compound (Z) are subjected to a condensation reaction, the amount of the compound (Z) used is preferably from 0.5 to 2 mol, particularly preferably from 0.6 to 1.5 mol per 1 mol of the compound (Y). Further, the amount of the compound (X1) used is preferably from 0.1 to 2 mol, particularly preferably from 0.2 to 1.5 mol per 1 mol of the compound (Y). When the amounts of the respective components used are within the above ranges, the obtainable cured product and nonlinear optical material are excellent in the transparency in the 1.3 μm band or 1.5 μm band and in the heat resistance.

<Reaction of Prepolymer (A1) and Organic Compound (B)>

By reacting the prepolymer (A1) and the organic compound (B), the prepolymer (C1) is obtainable.

In the reaction of the prepolymer (A1) and the organic compound (B), at least one of the crosslinkable functional group, the phenolic hydroxy group and the fluorine atom-substituted aromatic ring which the prepolymer (A1) has, and the reactive group which the organic compound (B) has, are reacted, and both the compounds are bonded by a covalent bond. The reaction method is not particularly limited, and a known method may be employed. For example, a nucleophilic addition reaction of the fluorine atom-substituted aromatic ring and a hydroxy group, a mercapto group or an amino group in the presence of a dehydrohalogenating agent; an addition reaction of an epoxy group and a hydroxy group in the presence of an acid catalyst; an addition reaction of a maleimide group and a mercapto group or an amino group; a cycloaddition reaction of an acetylene and an azide group with heating or in the presence of a copper catalyst; a radical addition reaction of an acryloyl(oxy) group or a methacryloyl(oxy) group and a mercapto group under light irradiation conditions or in the presence of a radical generator; or an addition reaction of the phenolic hydroxy group and an isocyanate group in the presence of a basic catalyst may, for example, be mentioned.

In view of easy control of the reaction, preferred is a nucleophilic addition reaction of the fluorine atom-substituted aromatic ring and a hydroxy group, a mercapto group or an amino group in the presence of a dehydrohalogenating agent; an addition reaction of a maleimide group and a mercapto group or an amino group; or a cycloaddition reaction of an acetylene and an azide group with heating or in the presence of a copper catalyst.

Now, the reaction of the prepolymer (A1) and the organic compound (B) will be described in further detail with reference to specific Examples, however, the reaction is not limited thereto.

In a case where the organic compound (B) has a hydroxy group as the reactive group, and the fluorine atom-substituted aromatic ring which the prepolymer (A1) has and the hydroxy group of the organic compound (B) are reacted, it is preferred to mix the prepolymer (A1) and the organic compound (B) so as to be reacted in the presence of the dehydrohalogenating agent.

This reaction is carried out preferably in a polar solvent (such as diethyl ether, THF, dioxane, N,N-dimethylacetamide, N,N-dimethylformamide, N-methylpyrrolidone or dimethyl sulfoxide).

The dehydrohalogenating agent may be the same dehydrohalogenating agent as mentioned in the method for producing the prepolymer (A1) (for example, sodium hydroxide, potassium hydroxide or potassium tert-butoxide).

The amount of the dehydrohalogenating agent used is necessarily at least 1 mol, preferably from 1.1 to 3 mol per 1 mol of the hydroxy group of the organic compound (B).

The reaction temperature is preferably from 10 to 200° C., and particularly preferably from 40 to 160° C., whereby the reaction time will not be too long, and an undesired side reaction will not occur.

In the reaction, a reaction represented by the following formula (2) proceeds on at least one fluorine atom-substituted aromatic ring which the prepolymer (A1) has to obtain the prepolymer (C1).

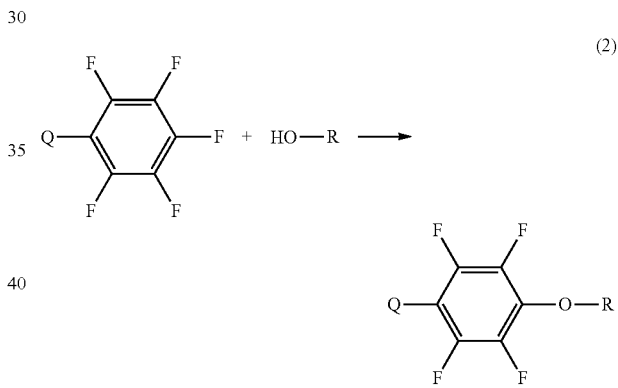

(2)

In the formula (2), Q is a structure of the prepolymer (A1), and R is a structure of the organic compound (B).

In a case where the prepolymer (A1) has a maleimide group as the crosslinkable functional group, the organic compound (B) has a mercapto group as the reactive group, and the maleimide group of the prepolymer (A1) and the mercapto group of the organic compound (B) are reacted, it is preferred that they are dissolved in an organic solvent, and mixed and reacted at room temperature or with heating.

The organic solvent is not particularly limited so long as both the prepolymer (A1) and the organic compound (B) are soluble, however, in view of the solubility, preferred is acetone, methyl ethyl ketone, THF, N,N-dimethylacetamide, N,N-dimethylformamide, N-methylpyrrolidone or dimethyl sulfoxide.

The reaction temperature is preferably from room temperature to 200° C., and particularly preferably from 40 to 150° C., whereby the reaction time will not be too long, and an undesired side reaction will not occur.

In this reaction, a reaction represented by the following formula (3) proceeds on at least one maleimide group which the prepolymer (A1) has to obtain the prepolymer (C1).

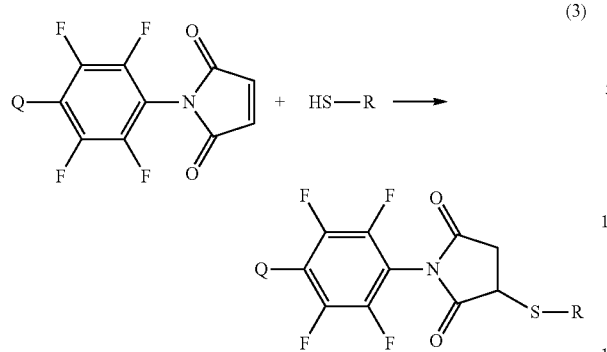

(3)

In the formula (3), Q is a structure of the prepolymer (A1), and R is a structure of the organic compound (B).

In a case where the prepolymer (A1) has an ethynyl group as the crosslinkable functional group, the organic compound (B) has an azide group as the reactive group, and the ethynyl group of the prepolymer (A1) and the azide group of the organic compound (B) are reacted, it is preferred that they are mixed and reacted without a catalyst or in the presence of a copper catalyst.

In a case where they are reacted without a catalyst, it is preferred that they are dissolved in a solvent and heated, or they are mixed without a solvent and heated to be reacted. The solvent is not particularly limited, and may, for example, be water, an alcohol (such as methanol, ethanol, 2-propyl alcohol or tert-butyl alcohol), an ether (such as diethyl ether, THF or dioxane), an ester (such as ethyl acetate, propyl acetate or 1-ethoxy-2-propyl alcohol acetate), a ketone (such as acetone, ethyl methyl ketone or cyclohexanone), a halogenated solvent (such as dichloromethane, dichloroethane, chlorobenzene or dichlorobenzene), an aromatic solvent (such as benzene, toluene or xylene), N,N-dimethylacetamide, N,N-dimethylformamide, N-methylpyrrolidone or dimethyl sulfoxide. The reaction temperature is preferably from 50 to 200° C., and is particularly preferably from 80 to 160° C., whereby a side reaction is less likely to occur, and the reaction may be carried out at a sufficient reaction rate. As a reaction apparatus, an apparatus employing microwaves may be employed, whereby the reaction can be carried out in a very short time, although the size of the apparatus is restricted.

In the case of using a copper catalyst, the copper catalyst is preferably a monovalent copper catalyst (such as copper (I) chloride, copper(I) bromide, copper(I) iodide or copper(I) cyanide). Further, it is also possible to use a bivalent copper catalyst such as copper(II) sulfate or copper(II) acetate and an ascorbate in combination. The reaction is preferably carried out by adding the prepolymer (A1), the organic compound (B) and the catalyst and mixing them in the solvent. The amount of the copper catalyst used is preferably an amount corresponding to 0.01 to 10 mol % of the azide groups, particularly preferably from 0.1 to 5 mol %. As the reaction temperature, the reaction will proceed with a favorable yield even at room temperature, however, the reaction may be carried out with heating so as to increase the reaction rate.

In the reaction, a reaction represented by the following formula (4) proceeds on at least one ethynyl group which the prepolymer (A1) has to obtain the prepolymer (C1).

Here, an example in which the crosslinkable functional group is an ethynyl group is shown, however, the same reaction will proceed even in a case where the crosslinkable functional group is a substituted ethynyl group such as a methylethynyl group, an ethylethynyl group, a propylethynyl group, a n-butylethynyl group, a tert-butylethynyl group or a phenylethynyl group.

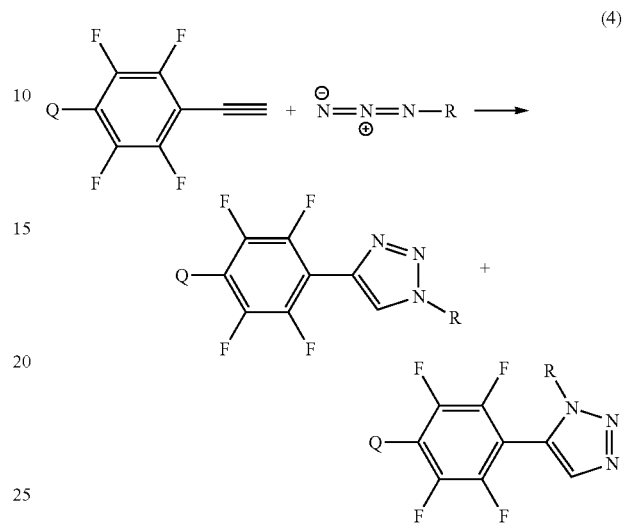

(4)

In the formula (4), Q is a structure of the prepolymer (A1), and R is a structure of the organic compound (B).

After the reaction of the prepolymer (A1) and the organic compound (B), the obtained prepolymer (C1) is purified as the case requires by a method such as neutralization, reprecipitation, extraction or filtration. The purification is carried out preferably in the presence of the polar solvent preferably used at the time of production or in a state where the prepolymer (C1) is dissolved or dispersed in the after-mentioned solvent (S) with a high efficiency.

(Method for Producing Prepolymer (C2))

The prepolymer (C2) is produced by reacting the organic compound (B) and the compound (X) with the prepolymer (A2).

<Prepolymer (A2)>

The prepolymer (A2) is a fluorinated polyarylene ether prepolymer and is produced by subjecting the compound (Y) and the compound (Z) to a condensation reaction in the presence of a dehydrohalogenating agent.

The condensation reaction may be carried out in the same manner as the condensation reaction in the method for producing the prepolymer (A1).

Preferred embodiments of the type and the amount of use of the dehydrohalogenating agent and the solvent used for the condensation reaction are the same as in the method for producing the prepolymer (A1).

In order to improve the heat resistance and the flexibility of the cured product of the prepolymer (C2) and the non-linear optical material, a co-condensation component may be added at the time of production of the prepolymer (A2).

The co-condensation component may be a compound (W) having two phenolic hydroxy groups.

The compound (W) may be the same compound as mentioned above. The compound (W) may be used alone or in combination of two or more.

The prepolymer (A2) is purified after the condensation reaction as the case requires by a method such as neutralization, reprecipitation, extraction or filtration. The purification is carried out preferably in the presence of the polar solvent preferably used at the time of production or in a state where the prepolymer (A2) is dissolved or dispersed in the after-mentioned solvent (S).

The number average molecular weight of the prepolymer (A2) is preferably from 1,000 to 500,000, more preferably from 1,500 to 200,000, particularly preferably from 1,500 to 150,000. Within such a range, the prepolymer (C2) obtainable from the prepolymer (A2) and a coating composition containing the prepolymer (C2) are easily applied, and the obtainable cured product and nonlinear optical material are excellent in the heat resistance, mechanical properties and the solvent resistance.

The number average molecular weight of the prepolymer (A2) may be controlled by changing the proportion of the compound (Y) and the compound (Z) charged.

In a case where the prepolymer (C2) is produced by using the prepolymer (A2), a hydroxy group may remain in the prepolymer (A2).

In a case where a hydroxy group remains in the prepolymer (A2), it is preferred that the compound (X2) or the compound (X3) is reacted with the remaining hydroxy group at the time of production of the prepolymer (C2) so that no hydroxy group remains in the prepolymer (C2), in view of favorable transparency of the obtainable cured product and nonlinear optical material in the 1.3 μm band or 1.5 μm band.

In order that no hydroxy group remains in the prepolymer (A2), it is preferred to adjust the number of moles of hydroxy groups of the compound (Z) not to exceed twice the number of moles of the compound (Y).

<Reaction of Prepolymer (A2), Organic Compound (B) and Compound (X)>

The organic compound (B) and the compound (X) are reacted with the prepolymer (A2) to obtain the prepolymer (C2).

In this reaction, the prepolymer (A2), the organic compound (B) and the compound (X) may be reacted simultaneously, or the prepolymer (A2) and the organic compound (B) may be reacted first, and before or after completion of the reaction, the compound (X) is added and reacted. Otherwise, the prepolymer (A2) and the compound (X) may be reacted first, and before or after completion of the reaction, the organic compound (B) is added and reacted. In a case where the organic compound (B) and the compound (X) are reactive with each other, the organic compound (B) and the compound (X) may be reacted first, and before or after completion of the reaction, the prepolymer (A2) is reacted.

In the reaction of the prepolymer (A2) and the organic compound (B), at least one of the phenolic hydroxy group and the fluorine atom-substituted aromatic ring which the prepolymer (A2) has and the reactive group which the organic compound (B) has are reacted to form a covalent bond. The reaction method is not particularly limited, and a known method may be employed. For example, the same method as in the reaction of the prepolymer (A1) and the organic compound (B) may be employed.

In the reaction of the prepolymer (A2) and the compound (X) in a case where the compound (X) is the compound (X1), they are bonded by a covalent bond by a reaction of the fluorine atom-substituted aromatic ring which the prepolymer (A2) has and the phenolic hydroxy group which the compound (X1) has. In the reaction of the prepolymer (A2) and the compound (X) in a case where the compound (X) is the compound (X2) or (X3), they are bonded by a covalent bond by a reaction of the phenolic hydroxy group which the prepolymer (A2) has, and the fluorine atom-substituted aromatic ring which the compound (X2) has or the aromatic ring substituted by a haloalkyl having at most 8 carbon atoms which the compound (X3) has. The reaction method may be the same method as in the preparation of the prepolymer (A1) or (A2), and specifically, preferred is a condensation reaction in the presence of the dehydrohalogenating agent. This method may also be employed in a case where the compound (X) is reacted with a reaction product of the prepolymer (A2) and the organic compound (B).

In a case where the compound (X) and the organic compound (B) are reactive with each other, they are bonded by a covalent bond by a reaction of at least one of the crosslinkable functional group, the phenolic hydroxy group and the fluorine atom-substituted aromatic ring which the compound (X) has and the reactive group which the organic compound (B) has. This reaction may also be the same method as in the reaction of the prepolymer (A1) and the organic compound (B) as mentioned above.

After the reaction of the prepolymer (A2), the organic compound (B) and the compound (X), the obtained prepolymer (C2) is purified as the case requires by a method such as neutralization, reprecipitation, extraction or filtration. The filtration is carried out preferably in the presence of the polar solvent preferably used at the time of production or in a state where the prepolymer (C2) is dissolved or dispersed in the after-mentioned solvent (S) in view of a high efficiency.

(Method for Producing Prepolymer (C3))

The prepolymer (C3) may be produced by reacting the organic compound (B) and the compound (X) with the prepolymer (A1).

The prepolymer (A1) may be the same as mentioned for the prepolymer (C1).

The reaction of the prepolymer (A1), the organic compound (B) and the compound (X) may be carried out in the same manner as in the above-described reaction of the prepolymer (A2), the organic compound (B) and the compound (X) except that the prepolymer (A1) is used instead of the prepolymer (A2).

The compound (X) to be reacted with the prepolymer (A1) may be the same as or different from the compound (X) used for preparation of the prepolymer (A1).

After the reaction of the prepolymer (A1), the organic compound (B) and the compound (X), the obtained prepolymer (C3) is purified as the case requires by a method such as neutralization, reprecipitation, extraction or filtration. The purification is carried out preferably in the presence of the polar solvent preferably used at the time of production or in a state where the prepolymer (C3) is dissolved or dispersed in the after-mentioned solvent (S) in view of a high efficiency.

(Method for Producing Prepolymer (C4))

The prepolymer (C4) is produced by reacting the compound (Z) and the organic compound (B) to obtain a condensate, subjecting the compound (Y) to a condensation reaction with the obtained condensate in the presence of a dehydrohalogenating agent to obtain a prepolymer (A3), and reacting the compound (X) with the prepolymer (A3).

The organic compound (B) to be used for production of the prepolymer (C4) has a reactive group capable of being condensed with the compound (Z). This reactive group is the above carbon atom bonded to a halogen atom, which is capable of undergoing a condensation reaction with the phenolic hydroxy group of the compound (Z) in the presence of a dehydrohalogenating agent, and specifically, preferred is a halogenated aromatic ring, particularly preferred is a fluorine atom-substituted aromatic ring such as polyfluorophenyl.

<Prepolymer (A3)>

The prepolymer (A3) is a fluorinated polyarylene ether prepolymer. The prepolymer (A3) is produced by subjecting the compound (Z) and the organic compound (B) to a condensation reaction to obtain a condensate, and subjecting the condensate and the compound (Y) to a condensation reaction in the presence of a dehydrohalogenating agent.

In the reaction of the compound (Z) and the organic compound (B), they are bonded by a carbon-oxygen covalent bond by a reaction of the phenolic hydroxy group which the compound (Z) has and the reactive group (the carbon atom bonded to a halogen atom) which the organic compound (B) has in the presence of a dehydrohalogenating agent.

The condensation reaction of the condensate and the compound (Y) may be carried out in the same manner as the condensation reaction in the method for producing the prepolymer (A1).

Preferred embodiments of the type and the amount of use of the dehydrohalogenating agent and the solvent used for the condensation reaction are the same as in the method for producing the prepolymer (A1).

In order to improve the heat resistance and the flexibility of a cured product of the prepolymer (C4) and a nonlinear optical material, a co-condensation component may be added at the time of production of the prepolymer (A3).

The co-condensation component may be a compound (W) having two phenolic hydroxy groups.

The compound (W) may be the same compound as above. The compound (W) may be used alone or in combination of two or more.

The prepolymer (A3) is purified after the condensation reaction as the case requires by a method such as neutralization, reprecipitation, extraction or filtration. The purification is carried out preferably in the presence of the polar solvent preferably used at the time of production or in a state where the prepolymer (A3) is dissolved or dispersed in the after-mentioned solvent (S) in view of efficiency.

The number average molecular weight of the prepolymer (A3) is preferably from 1,000 to 500,000, more preferably from 1,500 to 200,000, particularly preferably from 1,500 to 150,000. Within such a range, the coating properties of the prepolymer (C4) obtainable from the prepolymer (A3) are favorable, and the obtainable cured product and nonlinear optical material are excellent in the heat resistance, mechanical properties and the solvent resistance.

The number average molecular weight of the prepolymer (A3) may be controlled by changing the proportion of the compound (Y) and the condensate charged, and the dilution concentration in the reaction. The dilution concentration of the prepolymer (A3) is preferably from 5 to 10 mass %, particularly preferably from 5.5 to 8 mass %. When the dilution concentration is at least the lower limit of the above range, the reaction yield tends to be high, and an excellent production efficiency is achieved. When it is at most the upper limit of the above range, gelation hardly proceeds during the polymerization reaction, and an excellent yield of the polymer will be achieved.

<Reaction of Prepolymer (A3) and Compound (X)>

The prepolymer (A3) and the compound (X) are reacted to obtain the prepolymer (C4).

In this reaction, by the reaction of the prepolymer (A3) and the compound (X), they are bonded by a covalent bond by a reaction of the reactive group of at least one of the phenolic hydroxy group and the fluorine atom-substituted aromatic ring which the prepolymer (A3) has. The reaction method is not particularly limited, and a known method may be employed. In the reaction of the prepolymer (A3) and the compound (X) in a case where the compound (X) is the compound (X1), they are bonded by a covalent bond by a reaction of the fluorine atom-substituted aromatic ring which the prepolymer (A2) has and the phenolic hydroxy group which the compound (X1) has. In the reaction of the prepolymer (A3) and the compound (X) in a case where the compound (X) is the compound (X2) or (X3), they are bonded by a covalent bond by a reaction of the phenolic hydroxy group which the prepolymer (A3) has, and the fluorine atom-substituted aromatic ring which the compound (X2) has or the aromatic ring substituted by a haloalkyl having at most 8 carbon atoms which the compound (X3) has. The reaction method may be the same method as in preparation of the prepolymer (A1) or (A2), and specifically, preferred is a condensation reaction in the presence of a dehydrohalogenating agent. This method may be employed also in a case where the prepolymer (A3) and the compound (X) are reacted.

After the reaction of the prepolymer (A3) and the compound (X), the obtained prepolymer (C4) is purified as the case requires by a method such as neutralization, reprecipitation, extraction or filtration. The purification is carried out preferably in the presence of the polar solvent preferably used at the time of production or in a state where the prepolymer (C4) is dissolved or dispersed in the after-mentioned solvent (S) in view of a high efficiency.

(Function and Effects)

The above described prepolymer (C) of the present invention may form a nonlinear optical material excellent in the nonlinear optical effect, the heat resistance, the dielectric voltage and the transparency, from the following reasons.

Each of the prepolymers (A1) and (A2) and the compound (Z) has an aromatic ring, and is thereby excellent in compatibility with the organic compound (B) having a π electron conjugated system such as an aromatic ring. Accordingly, the prepolymer (A1) or (A2) or the compound (Z) and the organic compound (B) may be reacted in a uniform state, and in the prepolymer (C), units derived from the organic compound (B) are evenly distributed in the molecule. Accordingly, it will not occur such that units showing nonlinear optical properties are densely agglomerated, whereby orientation hardly occurs, thus decreasing the nonlinear optical effect.

The prepolymer (C) is produced by using the compound (Z) and has crosslinkable functional groups. Thus, the prepolymer (C) has a branched structure, and accordingly at the time of curing the prepolymer (C), crosslinking between molecules or a chain extension reaction proceeds. Thus, from the prepolymer (C), a cured product and a nonlinear optical material excellent in the heat resistance and the dielectric voltage are obtained.

Further, since the prepolymer (C) has an aromatic ring, the resulting cured product and nonlinear optical material are further excellent in the heat resistance.

The prepolymer (C) has fluorine atoms. That is, it has C—F bonds having hydrogen atoms in C—H bonds substituted by fluorine atoms, and accordingly the ratio of C—H bonds is low. Since a C—H bond has absorption in the wavelength used for optical communication (1.3 μm band or 1.5 μm band), the prepolymer (C) having a low content of C—H bonds has high transparency at the wavelength used since absorption of light at the wavelength used is suppressed. Since the cured product and the nonlinear optical material obtainable from the prepolymer (C) have high transparency in the 1.3 μm band, an optical waveguide with good compatibility with an existing optical element is obtained. In an optical transmission device employing quartz optical fibers, the 1.3 μm band is employed in many cases as the wavelength, and accordingly the cured product may be used as an optical element such as a light-receiving element compatible with the wavelength used.

Since the prepolymer (C) is produced by using the compound (Y), a cured product and a nonlinear optical material excellent in the flexibility are obtained from the prepolymer (C). The density of ether bonds can be increased as compared with a fluorinated aromatic polymer produced from a fluorinated aromatic compound having a branched structure by itself. The flexibility of the main chain is improved and as a result, a cured product and a nonlinear optical material excellent in the flexibility are obtained. An excellent flexibility is particularly advantageous when the cured product or the nonlinear optical material is in a film form.

In the prepolymer (C), the prepolymer comprising a condensate of the compound (X), the compound (Y) and the compound (Z), and the organic compound (B) which develops nonlinear optical properties, are bonded by a covalent bond. Since the organic compound (B) is not only dispersed in the matrix formed by the prepolymer comprising a condensate of the compound (X), the compound (Y) and the compound (Z) but also directly bonded to the prepolymer, movement of the organic compound (B) is restricted when heated. Accordingly, molecules once oriented are likely to maintain their orientation, and a material having high heat resistance, which can maintain nonlinear optical properties even at high temperature, can be obtained.

The prepolymer (C) of the present invention may be any one of the prepolymers (C1), (C2), (C3) and (C4).

With a view to producing the prepolymer (A2) as a precursor easily with a small number of steps, preferred is the prepolymer (C2).

Further, from such a viewpoint that the amount of the crosslinkable functional groups contained is easily controlled, and a cured product obtainable from the prepolymer is excellent in the heat resistance, preferred is the prepolymer (C2) or (C4).

[Curable Material]

The curable material of the present invention comprises the prepolymer (C). The prepolymer (C) is usually not a single compound but is considered to be a mixture of condensed products having various structures.

The prepolymer (C) contained in the curable material of the present invention may be one type or two or more types.

The curable material of the present invention may consists solely of the prepolymer (C) or may be a composition which further contains a component other than the prepolymer (C).

For example, the curable material of the present invention may contain as the case requires a crosslinkable additive (D), a heat curing accelerator (E), a photosensitive agent (F), an adhesion-improving agent (G), another additive and the like. Each of these components may be used alone or in combination of two or more.

(Crosslinkable Additive (D))

The curable material of the present invention may contain a crosslinkable additive (D). The crosslinkable additive (D) is a component which further improves the heat resistance of the nonlinear optical material.

The crosslinkable additive (D) has preferably at least 2, more preferably from 2 to 20, particularly preferably from 2 to 8 crosslinkable functional groups. When the crosslinkable additive (D) has at least two crosslinkable functional groups, molecules can be crosslinked, whereby the heat resistance of the resulting cured material and nonlinear optical material can be improved. Further, specific examples and preferred examples of the crosslinkable functional groups contained in the curable additive (D) are the same as the specific examples and the preferred examples of the crosslinkable functional groups contained in the prepolymer (C).

The crosslinkable additive (D) may, for example, be specifically dipentaerythritol triacrylate triundecylate, dipentaerythritol pentaacrylate monoundecylate, ethoxylated isocyanuric acid triacrylate, ε-caprolactone-modified tris-(2-acryloxyethyl)isocyanurate, dipentaerythritol polyacrylate, 9,9-bis[4-(2-acryloyloxyethoxyl)phenyl]fluorene, polyethylene glycol diacrylate, polyethylene glycol dimethacrylate, polypropylene glycol diacrylate, polypropylene glycol dimethacrylate, ethoxylated bisphenol A diacrylate, ethoxylated bisphenol A dimethacrylate, propoxylated bisphenol A diacrylate, propoxylated bisphenol A dimethacrylate, 1,10-decanediol diacrylate, 1,6-hexanediol diacrylate, 1,6-hexanediol dimethacrylate, 1,4-butanediol dimethacrylate, 1,3-butanediol dimethacrylate, hydroxypivalic acid neopentyl glycol diacrylate, 1,9-nonanediol diacrylate, 1,9-nonanediol dimethacrylate, neopentyl glycol diacrylate, neopentyl glycol dimethacrylate, pentaerythritol triacrylate, trimethylolpropane triacrylate, ethoxylated trimethylolpropane triacrylate, propoxylated trimethylolpropane triacrylate, triallyl cyanurate, triallyl isocyanurate, trimethallyl isocyanurate, 1,4-butanediol divinyl ether, 1,9-nonanediol divinyl ether, cyclohexanedimethanol divinyl ether, triethylene glycol divinyl ether, trimethylolpropane trivinyl ether, pentaerythritol tetravinyl ether, 2-(2-vinyloxyethoxy)ethyl acrylate, 2-(2-vinyloxyethoxy)ethyl methacrylate, trimethylolpropane diallyl ether, pentaerythritol triallyl ether, dipentaerythritol hexaacrylate, pentaerythritol tetraacrylate, ethoxylated pentaerythritol tetraacrylate represented by the following formula (D-1), propoxylated pentarythritol tetraacrylate represented by the following formula (D-2), ditrimethylolpropane tetraacrylate, tricyclodecane dimethanol diacrylate, tricyclodecane dimethanol methacrylate or a compound represented by the following formula (D-3).

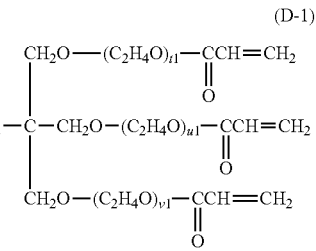

(in the formula, s1 + t1 + u1 + v1 is from 4 to 35)

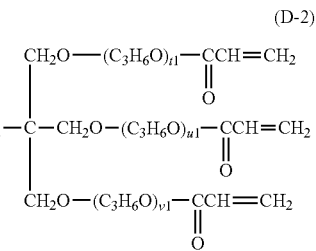

(in the formula, s2+t2+u2+v2 is about 4)

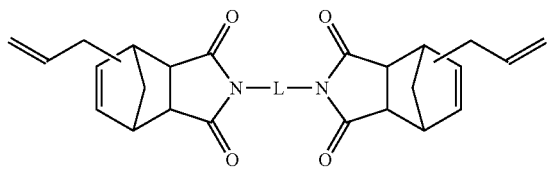

(D-3)

(in the formula, L is

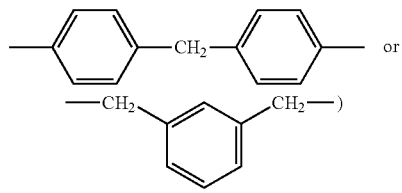

or

)

A commercially available product of the crosslinkable additive (D) may, for example, be a polyester acrylate (a compound having both terminals of a polyester diol obtained from a dihydric alcohol and a dibasic acid modified with acrylic acid, manufactured by TOAGOSEI CO., LTD., tradename: ARONIX (M-6100, M-6200, M-6250 or M-6500); or a compound having a hydroxy group terminal of a polyester polyol obtained from a polyhydric alcohol and a polybasic acid modified with acrylic acid, manufactured by TOAGOSEI CO., LTD., tradename: ARONIX (M-7100, M-7300K, M-8030, M-8060, M-8100, M-8530, M-8560 or M-9050)).

The content of the crosslinkable additive (D) in the curable material of the present invention is preferably from 0 to 90 mass %, particularly preferably from 0 to 50 mass % based on the total content (100 mass %) of all the components contained in the curable material.

(Heat Curing Accelerator (E))

In a case where the curable material of the present invention is heat-cured, the curable material may contain a heat curing accelerator (E).

The heat curing accelerator (E) may be known one. It may, for example, be specifically 2,2'-azobisisobutyronitrile, benzoyl peroxide, tert-butyl hydroperoxide, cumene hydroperoxide, di-tert-butyl peroxide or dicumyl peroxide.

The content of the heat curing accelerator (E) in the curable material of the present invention is preferably from 0 to 20 mass %, particularly preferably from 0 to 10 mass % based on the total content (100 mass %) of all the components contained in the curable material.

(Photosensitizing Agent (F))

In a case where the curable material of the present invention is photo-cued, the curable material may contain a photosensitizing agent (F).

The photosensitizing agent may be known one. It may, for example, be specifically IRGACURE 907 (α-aminoalkylphenone type), IRGACURE 369 (α-aminoalkylphenone type), DAROCUR TPO (acylphosphine oxide type), IRGACURE OXE01 (oxime ester derivative) or IRGACURE OXE02 (oxime ester derivative) (each manufactured by Ciba Specialty Chemicals K.K.). Among them, particularly preferred is DAROCUR TPO, IRGACURE OXE01, or IRGACURE OXE02.

The content of the photosensitizing agent (F) in the curable material of the present invention is preferably from 0 to 20 mass %, particularly preferably from 0 to 10 mass % based on the total content (100 mass %) of all the components contained in the curable material.

(Adhesion-Improving Agent (G))

The curable material of the present invention may contain an adhesion-improving agent (G) such as a silane coupling agent. By addition of the adhesion-improving agent (G), adhesion between a layer made of a cured product of the curable material and a layer adjacent thereto may be improved.

The content of the adhesion-improving agent (G) in the curable material of the present invention is preferably from 0 to 10 mass %, particularly preferably from 0 to 5 mass % based on the total content (100 mass %) of all the components contained in the curable material.

(Other Additives)

The curable material of the present invention may contain other additives such as a stabilizer (such as an ultraviolet absorber, an antioxidant or a thermal polymerization inhibitor), a surfactant (such as a leveling agent, a defoaming agent, an antisettling agent or a dispersing agent), a plasticizer or a thickener, as the case requires, within a range not to impair the effects of the present invention.

[Coating Composition]

The coating composition of the present invention comprises the curable material of the present invention and a solvent (S). By forming the curable material into a coating composition, favorable applicability to a substrate is achieved.

(Solvent (S))

The solvent (S) may be known one. It may, for example, be specifically propylene glycol monomethyl ether acetate (hereinafter sometimes referred to as "PGMEA"), ethyl acetate, propyl acetate, isopropyl acetate, butyl acetate, pentyl acetate, isopentyl acetate, isobutyl isobutyrate, methyl-3-methoxy propionate, dipropylene glycol methyl ether acetate, cyclopentanone, methyl ethyl ketone, methyl isobutyl ketone or dibutyl ketone.

The solvent (S) may be used alone or in combination of two or more.

The concentration of the prepolymer (C) in the coating composition is preferably from 1 to 50 mass %, particularly preferably from 1 to 30 mass % based on the total mass (100 mass %) of the coating composition.

[Nonlinear Optical Material]

The nonlinear optical material of the present invention is a nonlinear optical material which is a cured product of the curable material of the present invention, wherein units derived from the organic compound (B) in the cured material are oriented.

By the units derived from the organic compound (B) being oriented, the nonlinear optical material is excellent in nonlinear optical properties.

The nonlinear optical material of the present invention may be produced, for example, by the following steps (α), (β) and (γ).

(α) A step of forming a film made of the curable material.

(β) A step of applying an electric field to the film made of the curable material to orient the units derived from the organic compound (B).

(γ) A step of curing the film in a state where the units derived from the organic compound (B) are oriented to form a nonlinear optical material.

(Step (α))

The method of forming a film made of the curable material may be a known method such as a pressing method, an extrusion method or a solution casting method. In view of uniformity of the film thickness and the processability to a light control device, preferred is a solution casting method.

For formation of the film by a solution casting method, it is preferred to apply the coating composition of the present invention to a substrate and then remove the solvent (S).

The substrate may, for example, be a metal substrate (a substrate made of e.g. aluminum, gold, iron, nickel, chromium or stainless steel), a semiconductor substrate (a substrate made of e.g. silicon, silicon oxide, titanium oxide, zinc oxide or gallium arsenide), a glass substrate or a plastic substrate (a substrate made of e.g. polyimide, polyethylene terephthalate, polycarbonate, polyester, polymethyl methacrylate, polystyrene or polyamide).

On the surface of the substrate on which the film is to be formed, a functional film may be formed as the case requires. The functional film may, for example, be an electrically conductive film, an insulating film, a light reflecting film or an optical waveguide film. The functional film on the substrate surface may be a totally covering film or a patterned film as the case requires. Particularly, in order that the units derived from the organic compound (B) are oriented, an electrically conductive film is preferably formed on the surface of a non-electrically conductive substrate.

As mentioned above, on the surface of a non-electrically conductive substrate such as a semiconductor substrate, a glass substrate or a plastic substrate, an electrically conductive film may be formed as the case requires. For the electrically conductive film, a metal material (such as gold, titanium, copper, molybdenum or tungsten), an oxide (such as tin oxide, indium oxide, tin oxide-indium oxide composite oxide (hereinafter sometimes referred to as "ITO")), or an organic semiconductor (such as polythiophene, polyaniline, polyacetylene or polyparaphenylene vinylene) may, for example, be used. In a case where a substrate provided with an electrically conductive film is used, the film made of the curable material is formed on the electrically conductive film.

The application method may be a known method. Specifically, a spin coating method, a dip coating method, a spray coating method, a die coating method, a bar coating method, a doctor coating method, an extrusion coating method, a scan coating method, a blush coating method, a potting method, inkjet or printing may, for example, be mentioned.

Removal of the solvent (S) may be carried out by a conventional method such as reducing the pressure, heating or heating under reduced pressure. The heating temperature and time are set so that the solvent (S) can be removed and the curable material is not completely heat-cured.

(Step (β))

In the step (β), an electric field is applied to the film made of the curable material obtained in the step (α) in a state where it is heated to a temperature of at least the glass transition temperature (Tg) of the prepolymer (C) to orient the units derived from the organic compound (B) (hereinafter sometimes referred to as "polling treatment").

As the polling treatment method, a known method of applying an electric field or a method employing corona discharge may, for example, be employed. The application voltage is preferably from 1 to 15 kV, particularly preferably from 2 to 10 kV.

The heating temperature at the time of the polling treatment (hereinafter sometimes referred to as "polling temperature") is preferably at least the glass transition temperature (Tg) of the prepolymer (C), particularly preferably from 80 to 250° C.

(Step (γ))

In the step (γ), the film is cured in a state where the units derived from the organic compound (B) are oriented, to form a nonlinear optical material.

To cure the film, crosslinkable reactive groups of e.g. the prepolymer (C) are reacted by the action of external energy to cure the film. As the curing method, heat or light (actinic rays) may be mentioned, or both may be used in combination.

In a case where heat is used for curing, the curing temperature may be the same as the polling temperature, or may be set higher. To simplify the steps, curing is carried out preferably at the same temperature as the polling temperature. In such a case, the step (β) and the step (γ) proceed simultaneously.

After the film is cured by heat, the temperature is decreased to a level of from 20 to 60° C., and then the electric field is removed to form the nonlinear optical material. In a case where the film is cured by a method other than by heat, after the units derived from the organic compound (B) are oriented in the step (β) and before the film is cured, the temperature may be decreased to a level of from 20 to 60° C.

In a case where heat is employed for curing, the curable material may contain the heat curing accelerator (E). The temperature is preferably from 40 to 500° C., more preferably from 60 to 300° C., further preferably from 70 to 280° C., particularly preferably from 120 to 250° C. If the temperature is too low, stability of the prepolymer (C) or a composition containing the prepolymer (C) at the time of storage may not be secured, and if the temperature is too high, thermal decomposition of the prepolymer (C) itself or the substrate, or decomposition of the units derived from the organic compound (B) may occur.

In a case where light is employed for curing, the curable material preferably contains the photosensitizing agent (F).

In a case where light is used as the external energy, by selectively irradiating only a desired portion with light, it is possible that only the exposed portion has a high molecular weight and the nonexposed portion is dissolved in a developer and removed. As the case requires, after exposure and development, an external energy such as light or heat may be applied to further increase the molecular weight.

The nonlinear optical material of the present invention is excellent in the nonlinear optical effect, the heat resistance, the dielectric voltage and the transparency and is thereby useful for an optical waveguide, a light control device and the like. An optical waveguide, a light control device and the like can maintain the nonlinear optical effect for a long time and have a small light transmission loss.

[Optical Waveguide]

Of the optical waveguide of the present invention, either one or both of a core and a clad is made of the nonlinear optical material of the present invention. The other may be made of an inorganic material. That is, a combination of the core made of the nonlinear optical material of the present invention and the clad made of an inorganic material, or a combination of the core made of an inorganic material and the clad made of the nonlinear optical material of the present invention may be acceptable.

An optical waveguide comprising a core made of an inorganic material and a clad made of the nonlinear optical material may, for example, be specifically an optical waveguide as disclosed in IEEE JOURNAL OF SOLID-STATE CIRCUITS, 2010, vol. 45, No. 1, p. 235. As the nonlinear optical material of such an optical waveguide, the nonlinear optical material of the present invention may be employed.

FIG. 1 is a cross-sectional view illustrating an example of the optical waveguide of the present invention, vertical to the core length direction. An optical waveguide 1 shown in FIG. 1 is in a film form comprising a plurality of cores 10 provided in parallel with one another at intervals, and a clad 20 surrounding the cores 10.

(Core)

The refractive index of the cores 10 is higher than the refractive index of the clad 20.

The cross-sectional shape of the cores 10 is rectangular in FIG. 1, but is not limited thereto. It may, for example, be trapezoidal, circular, elliptical or polygonal of pentagonal or more. In a case where the cross-sectional shape of the cores 10 is polygonal, the angles may be rounded.

The cross-sectional shape and the size of the cores 10 are properly set considering e.g. the binding efficiency to a light source or a light-receiving element. The binding efficiency depends on the core diameter and the numerical aperture (NA).

The number of the cores 10 is 4 in FIG. 1, but is not limited thereto.

The width a and the height b of each core 10 are respectively preferably at a level of from 1 to 100 μm. When the width a and the height b of each core 10 are at least 1 μm, a decrease in the binding efficiency to a light source or a light-receiving element can be suppressed. When the width a and the height b of each core 10 are at most 100 μm, even when the optical waveguide is bent with a binding radius (R) at a level of 1 mm, the bending loss can be suppressed to be small. Further, the size (width and height) of a light-receiving portion of photodiode (PD) used as the light-receiving element is usually at most 100 μm, and thus from this viewpoint also, the width a and the height b of each core 10 are preferably at most 100 μm.

(Clad)

The clad 20 comprises an under clad layer 22 and an over clad layer 24.

The material of the under clad layer 22 and the lower clad layer 24 may be the same or different so long as the refractive index of the under clad layer 22 and the refractive index of the over clad layer 24 are lower than the refractive index of the cores 10.

The thickness c of the under clad layer 22 and the thickness d of the over clad layer 24 are designed so that the light loss is small depending upon the numerical aperture (NA). Transmission of light is possible even by a structure such that one or both of the under clad layer 22 and the over clad layer 24 is not present, and the cores 10 are in contact with the air layer, however, it is preferred that the under clad layer 22 and the over clad layer 24 are provided.

The thickness c of the under clad layer 22 is preferably from 5 to 50 μm in view of protection of the cores 10.

The thickness d of the over clad layer 24 is preferably thicker than the height b of the cores 10 and from 15 to 150 μm in view of protection of the cores 10.

The thickness (c+d) of the clad 20 is preferably from 20 to 200 μm.

(Method for Producing Optical Waveguide)

The optical waveguide of the present invention may be produced, for example, by the following steps (a) to (c). In the method for producing the optical waveguide, the coating composition of the present invention is used for formation of either one or both of the core and the clad.

(a) A step of forming the under clad layer on the surface of the substrate.

(b) A step of forming the core on the surface of the under clad layer.

(c) A step of forming the over clad layer so as to cover the surface of the under clad layer and the core.

Now, the method for producing the optical waveguide will be described in detail with reference to a method in which the over clad layer 24 of the optical waveguide 1 shown in FIG. 1 is made of the curable material of the present invention, and the under clad layer 22 and the core 10 are formed by a curable material containing no organic compound (B) nor units derived therefrom (hereinafter referred to as curable material (H)).

The curable material containing no units derived from the organic compound (B) is preferably a curable material containing a prepolymer similar to the prepolymer (C) of the present invention except that it contains no units derived from the organic compound (B). This prepolymer is preferably a prepolymer having crosslinkable functional groups, comprising a condensate of the compound (X), the compound (Y) and the compound (X). The curable material (H) containing the prepolymer containing no units derived from the organic compound (B) contains no organic compound (B) either.

For formation of the film made of the curable material (H), it is preferred to use a coating composition comprising the above prepolymer and the solvent (S) similarly to the coating composition of the present invention.

Further, the refractive index of a cured product of the curable material (H) may change depending upon the curable component or additives. Accordingly, as a cured product of the curable material (H), a cured product having a refractive index higher or lower than the refractive index of the cured product of the curable material of the present invention may be formed, or a cured product having the same refractive index as the curable material of the present invention may be formed.

(Step (a))

Figure 2:
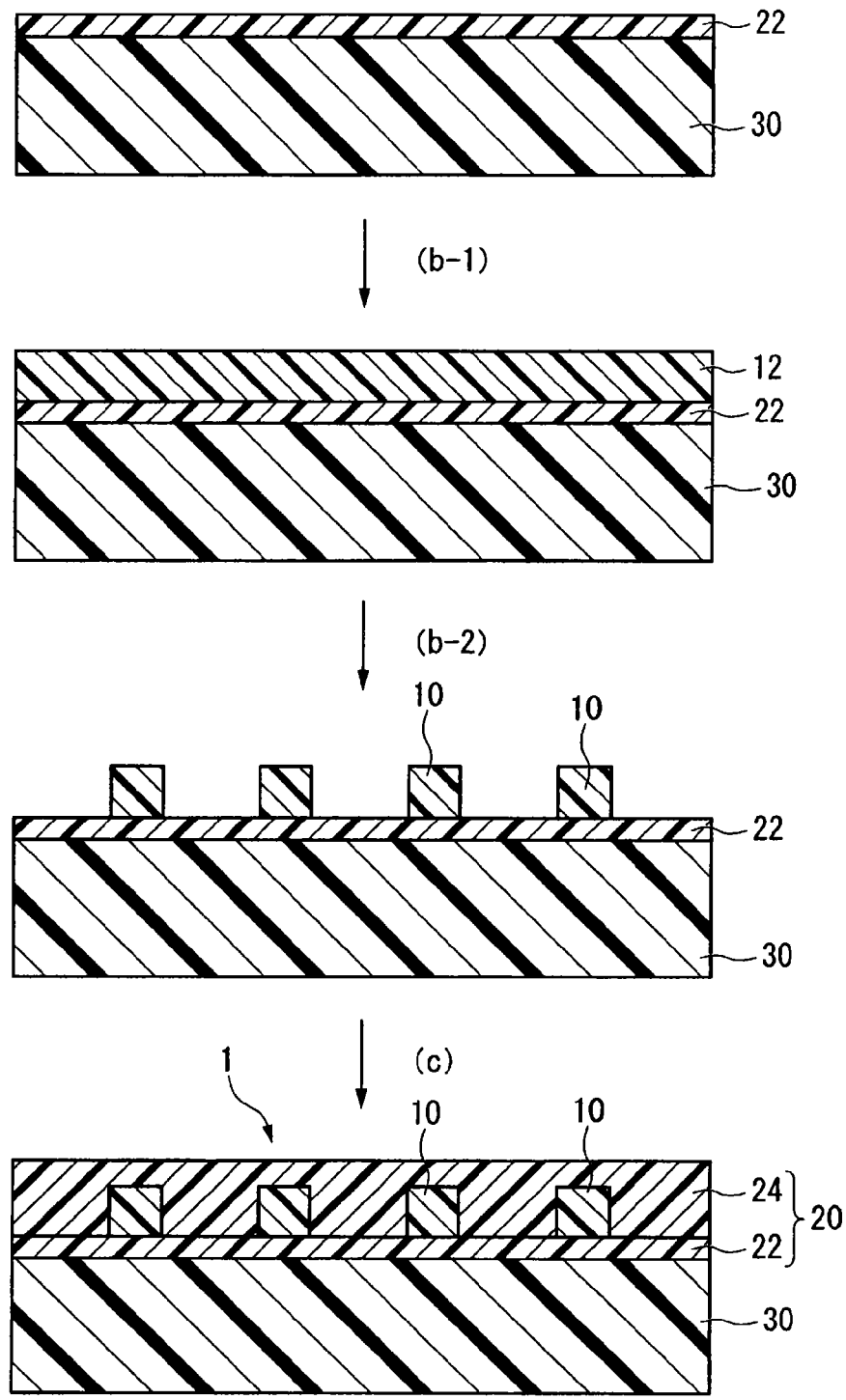
FIG. 2 is a cross-sectional view illustrating a process for producing an optical waveguide.

As shown in FIG. 2, on the surface of a substrate 30, a film of the curable material (H) is formed and cured by heating and/or light irradiation to form an under clad layer 22. Before formation of the film of the curable material (H) on the surface of the substrate 30, the adhesion-improving agent (G) may be applied to the surface of the substrate 30. Further, the adhesion-improving agent (G) may be applied between layers of the under clad layer 22, the core 10 and the over clad layer 24.

The substrate 30 may, for example, be a plastic film or silicon. The material of the plastic film may, for example, be polyimide or polyethylene terephthalate.

In a case where the optical waveguide is used in a state where the clad 20 and the substrate 30 are integrated, the curable composition preferably contains the adhesion-improving agent (G).

(Step (b))

As shown in FIG. 2, on the surface of the under clad layer 22, a film of the curable material (H) having a refractive index higher than that of the curable material (H) forming the under clad layer is formed and prebaked to form a semicured core precursor layer 12 (step (b-1)).

Then, as shown in FIG. 2, the core precursor layer 12 is processed by photolithography to form cores 10. For example, the core precursor layer 12 is irradiated with light (exposed) via a photomask and developed to form cores 10 (step (b-2)).

Then, the cores 10 are completely cured by post-baking.

(Step (c))

As shown in FIG. 2, on the surface of under clad layer 22 and the cores 10, a film of the curable material of the present invention having the same refractive index as the curable material (H) forming the under clad layer is formed. Then, in the same manner as the under clad layer 22, the film is cured by heating and/or light irradiation, whereby an over clad layer 24 is formed, and an optical waveguide 1 is obtained. As the case requires, the substrate 30 may be peeled and removed. In the optical waveguide 1 shown in FIG. 2(c), control electrodes are provided on the over clad layer 24.

[Light Control Device]

The light control device of the present invention comprises the optical waveguide of the present invention and electrodes to apply a voltage to one made of the nonlinear optical material of the present invention between the core and the clad of the optical waveguide.

The light control device of the present invention may, for example, be specifically a phase control device (a phase modulator, a temperature-compensated phase modulator, a serrodyne phase modulator for generation of single sideband, a branch interferometric modulator, a balance bridge modulator, a directional coupler device (a directional coupler modulator/switch, a reverse Δβ directional coupler, a traveling-wave directional coupler, a light wavelength filter), a refractive index distribution control device (an internal total reflection switch, a multipoint switch, a TE/TM mode splitter, an intersecting bipolar switch, a cutoff switch), or an electro optical grating control device (an optical deflector, a Bragg deflection switch, a TE/TM mode convertor, a light wavelength filter, an even-odd mode conversion type light wavelength variable filter, a waveguide-radiation mode convertor).

FIGS. 3 to 7 are plan views illustrating an example of a light control device of the present invention.

Figure 3:
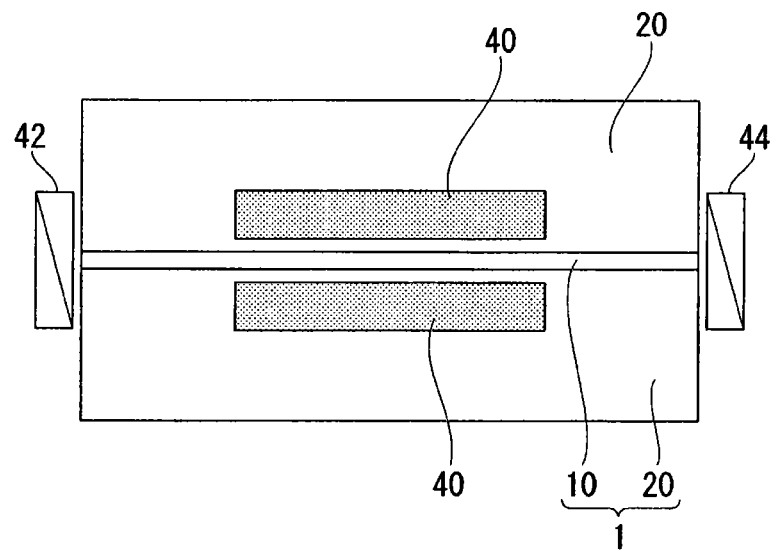
FIG. 3 is a plan view illustrating an example of a light control device of the present invention.

FIG. 3 illustrates the structure of a linear modulator. It comprises an optical waveguide 1 comprising one core 10 made of the nonlinear optical material of the present invention and a clad 20 covering the core 10, a pair of control electrodes 40 disposed to sandwich the core 10, a polarizer 42 disposed on one end of the core 10, and a sensor 44 disposed on the other end of the core 10.

Figure 4:
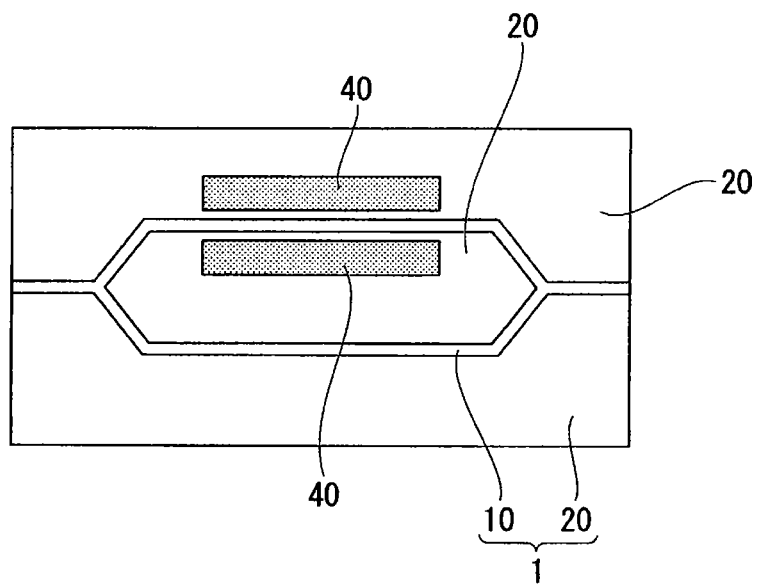
FIG. 4 is a plan view illustrating another example of a light control device of the present invention.

FIG. 4 illustrates the structure of a Mach-Zehnder modulator. It comprises an optical waveguide 1 comprising a core 10 made of the nonlinear optical material of the present invention which is branched into two lines in the middle and then merged again into one line, and a clad 20 covering the core 10, and a pair of control electrodes 40 disposed to sandwich one line of the core 10 at the branched portion.

Figure 5:
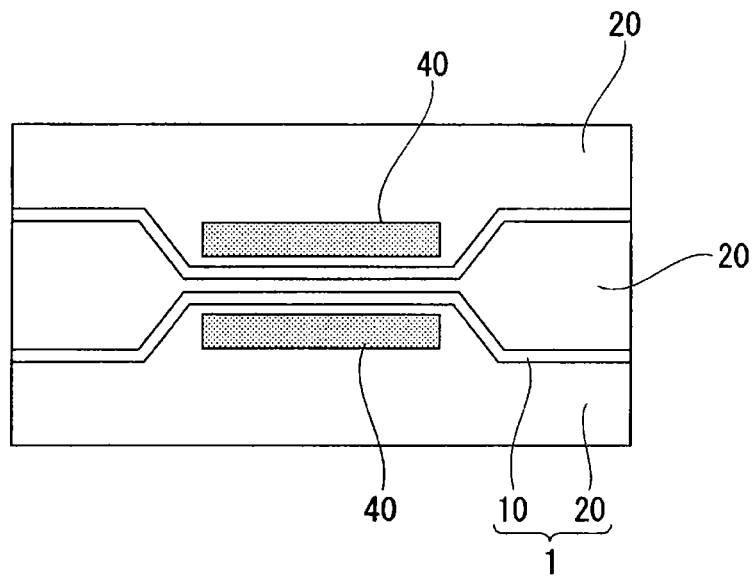
FIG. 5 is a plan view illustrating another example of a light control device of the present invention.

FIG. 5 illustrates the structure of a directional coupler switch. It comprises an optical waveguide 1 comprising two cores 10 which are made of the nonlinear optical material of the present invention and of which the distance is narrowed in the middle, and a clad 20 covering the cores 10, and a pair of control electrodes 40 disposed to sandwich the two cores 10 from the outside at a portion where the distance is narrowed.

Figure 6:
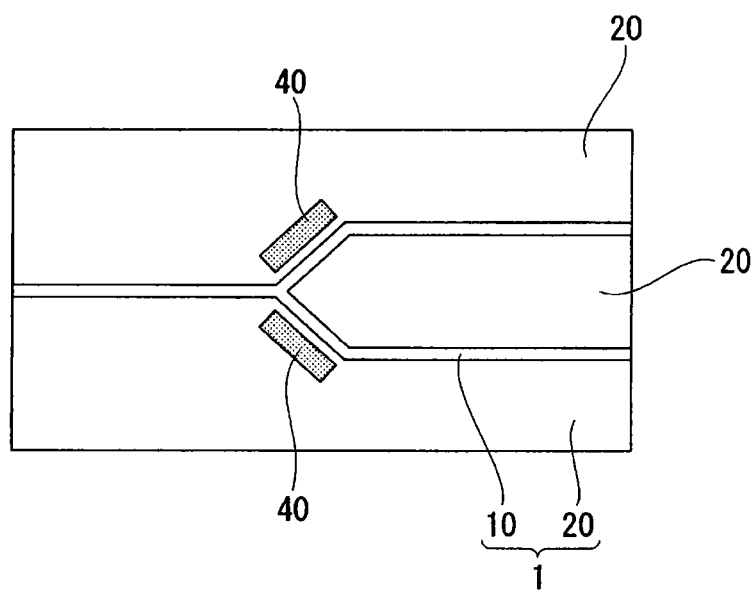
FIG. 6 is a plan view illustrating another example of a light control device of the present invention.

FIG. 6 illustrates the structure of a Y multipoint switch. It comprises an optical waveguide 1 comprising a core 10 made of the nonlinear optical material of the present invention, which is branched into two lines in the middle, and a clad 20 covering the core 10, and a pair of control electrodes 40 disposed to sandwich the two lines of the core 10 from the outside at the branched portion.

Figure 7:
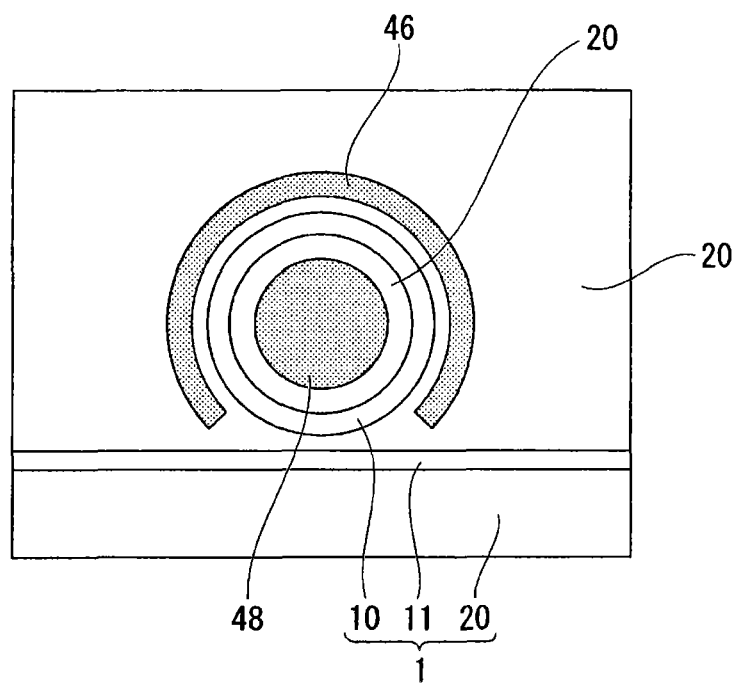
FIG. 7 is a plan view illustrating another example of a light control device of the present invention.

FIG. 7 illustrates the structure of a ring resonator modulator. It comprises an optical waveguide 1 comprising a linear core 10, a ring-form core 10 made of the nonlinear optical material of the present invention, formed at a distance from the core 11, and a clad 20 covering the core 10 and the core 11, a circular arch outer control electrode 46 disposed along the periphery of the core 10, and a circular inner control electrode 48 disposed on the inner side of the core 10.

EXAMPLES

Now, the present invention will be described in further detail with reference to Examples. However, it should be understood that the present invention is by no means restricted to such specific examples. Ex. 1 to 3 and 5 to 16 are Examples of the present invention, and Ex. 4 and 17 are Comparative Examples.

The organic compound (B) used in Ex. 1 to 4 is as follows.

Organic compound (B-1): manufactured by Tokyo Chemical Industry Co., Ltd., tradename: D3284. The second order molecular hyperpolarizability is $49 \times 10^{-30}$ esu according to the literature (J. Phys. Chem., 1991, vol. 95, p. 10631 to 10643). It is an organic compound (B) wherein the π electron conjugated system is a combination of an aromatic ring and/or a π electron conjugated heterocyclic ring and an unsaturated bond, and is one example of azobenzene derivatives.

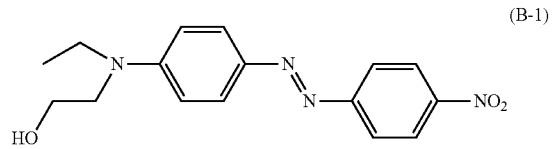 [SMILES: CCN(CCO)c1ccc(/N=N/c2ccc([N+](=O)[O-])cc2)cc1]

(B-1)

Production Example 1

Prepolymer (A2-1)

In N,N-dimethylacetamide (hereinafter sometimes referred to as "DMAc"), perfluorobiphenyl and 1,3,5-trihydroxybenzene were reacted in the presence of potassium carbonate to prepare prepolymer (A2-1). The obtained DMAc solution of prepolymer (A2-1) was poured into a hydrochloric acid aqueous solution for reprecipitation and purification, followed by vacuum drying to obtain powdery prepolymer (A2-1).

The number average molecular weight of prepolymer (A2-1) was 50,000. As a result of analysis by $^{19}$F-NMR, the content of fluorine atoms corresponding to the para-position of perfluorobiphenyl contained in prepolymer (A2-1) was 1.49 mmol per 1 g of prepolymer.

Using Q1000 manufactured by TA Instruments Japan Inc., differential scanning calorimetry (hereinafter sometimes referred to as "DSC") was carried out. Specifically, temperature increase and temperature decrease were repeated twice at 10° C./min from 25° C. to 250° C. for measuring. As a result, the glass transition temperature of prepolymer (A2-1) was 130° C. and was confirmed to be sufficiently higher than the glass transition temperature (about 100° C.) of PMMA.

Production Example 2

Prepolymer (A2-2)

In DMAc, perfluorobiphenyl and 1,1,1-tris(4-hydroxyphenyl)ethane were reacted in the presence of potassium carbonate to prepare prepolymer (A2-2). The obtained DMAc solution of prepolymer (A2-2) was poured into a hydrochloric acid aqueous solution for reprecipitation and purification, followed by vacuum drying to obtain powdery prepolymer (A2-2).

The number average molecular weight of prepolymer (A2-2) was 36,000. As a result of analysis by $^{19}$F-NMR, the content of fluorine atoms corresponding to the para-position of perfluorobiphenyl contained in prepolymer (A2-2) was 1.33 mmol per 1 g of prepolymer.

As a result of DSC measurement in the same manner as in Preparation Example 1, the glass transition temperature of prepolymer (A2-2) was 170° C., and was confirmed to be sufficiently higher than the glass transition temperature of PMMA.

Preparation Example 3

Organic Compounds (B-2-a, B-2-b)

Organic compounds (B-2-a, B-2-b) used in Ex. 5 were prepared as follows.

Organic compound (B-1) (10 g, 32.8 mmoL) and methanesulfonyl chloride (MsCl, 18.7 g, 15.9 mmoL as MsCl) were dissolved in tetrahydrofuran (hereinafter sometimes referred to as "THF"). Triethylamine (17.7 g) was added, followed by stirring at 0° C. for 2.5 hours. The reaction solution was dropwise added to water (500 mL), and precipitated solid was collected by filtration and vacuum dried to obtain compound (b-1).

Compound (b-1) (11.3 g, 28.7 mmoL) and sodium azide (NaN$_3$, 3.81 g, 57.3 mmoL as NaN$_3$) were dissolved in dimethyl sulfoxide (hereinafter sometimes referred to as "DMSO"), followed by stirring at 80° C. for one hour with heating. The reaction solution was dropwise added into water (300 mL), and precipitated solid was collected by filtration and vacuum dried to obtain powdery compound (b-2). Compound (b-2) (9.4 g, 27.8 mmoL) and pentafluoroacetylene (PFPA, 23.7 g, 122.4 mmoL as PFPA) were dissolved in 1,2-dichlorobenzene (169 mL), followed by reflux with heating at 180° C. for 5 hours to obtain a reaction liquid containing organic compound (B-2) (a mixture of organic compound (B-2-a) and organic compound (B-2-b) in a ratio of organic compound (B-2-a) to organic compound (B-2-b) of from 1:1 to 4:1).

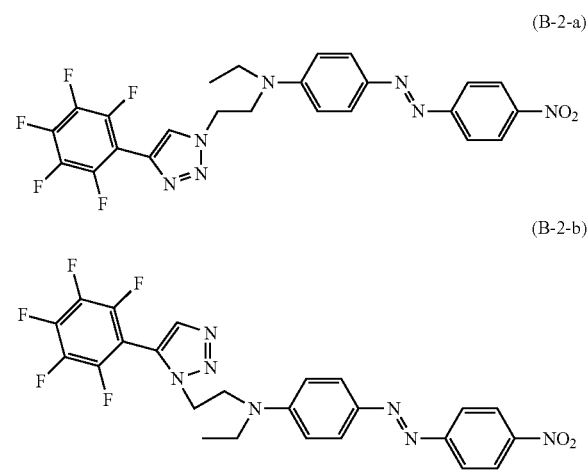

The above solution was diluted with chloroform in the same amount as the reaction liquid and dropwise added to a 1:1 (volume ratio) mixed liquid of hexane and methanol for reagglomeration. Solid was collected by suction filtration while washing with water, methanol and hexane in this order, and vacuum dried to obtain organic compound (B-2-a) (8.38 g, 15.8 mmoL). Further, the filtrate was recovered.

The solvent was distilled off from the above recovered filtrate, and the resulting precipitates were collected by suction filtration while washing with hexane, and vacuum dried to obtain organic compound (B-2-b) (3.41 g, 6.41 mmoL).

Ex. 1

Prepolymer (C2-1)

Prepolymer (A2-1) (10 g) obtained in Preparation Example 1 and organic compound (B-1) (2.34 g, 7.45 mmoL) were dissolved in THF. In mineral oil, a 60% dispersed sodium hydride powder (0.60 g, 15.0 mmoL as NaH) was added, followed by stirring under reflux. After complete consumption of organic compound (B-1) was confirmed by thin-layer chromatography, the reaction solution was slowly dropwise added to a methanol solution of ammonium chloride. After the pH was confirmed to be neutralized, the obtained precipitates were separated by centrifugal separation. The precipitates were recovered by suction filtration, sufficiently washed with methanol, AK225 (tradename, manufactured by Asahi Glass Company, Limited) and hexane and dried under reduced pressure at 100° C. to obtain a red-orange powder. Then, the obtained red-orange powder (5 g) and 4-acetoxystyrene (1.21 g, 7.45 mmoL) were reacted in DMAc in the presence of potassium hydroxide to prepare prepolymer (C2-1). The obtained DMAc solution of prepolymer (C2-1) was subjected to filtration with Celite and further slowly added to a methanol solution of ammonium chloride again for reprecipitation and purification, followed by suction filtration, washing and vacuum drying to obtain red powdery prepolymer (C2-1) (4.56 g, yield: 81%).

As a result of analysis of prepolymer (C2-1) by $^1$H-NMR, units derived from organic compound (B-1) and units derived from 4-acetoxystyrene were introduced in a molar ratio of 49:51.

Ex. 2

Prepolymer (C2-2)

Prepolymer (A2-2) (1 g) obtained in Preparation Example 2 and organic compound (B-1) (0.209 g, 0.665 mmoL) were dissolved in THF. In mineral oil, a 60% dispersed sodium hydride powder (0.07 g, 1.75 mmoL as NaH) was added, followed by stirring under reflux. After complete consumption of organic compound (B-1) was confirmed by thin-layer chromatography, the reaction solution was slowly dropwise added to a methanol solution of ammonium chloride. After the pH was confirmed to be neutralized, the obtained precipitates were subjected to centrifugal separation and recovered by suction filtration, sufficiently washed with methanol, AK225 and hexane and dried under reduced pressure at 100° C. to obtain a red-orange powder. Then, the obtained red-orange powder (0.7 g) and 4-acetoxystyrene (0.149 g, 0.917 mmoL) were reacted in DMAc in the presence of potassium hydroxide to prepare prepolymer (C2-2). The obtained DMAc solution of prepolymer (C2-2) was subjected to filtration with Celite and then slowly added to a methanol aqueous solution of ammonium chloride again for reprecipitation and purification, followed by suction filtration, washing and vacuum drying to obtain orange powdery prepolymer (C2-2) (0.521 g, yield: 73%).

As a result of analysis of prepolymer (C2-2) by $^1$H-NMR, units derived from organic compound (B-1) and units derived from 4-acetoxystyrene were introduced in a molar ratio of 51:49.

Ex. 3

Prepolymer (C2-3)

Prepolymer (A2-2) (3 g) obtained in Preparation Example 2 and organic compound (B-1) (0.376 g, 1.20 mmoL) were dissolved in THF. In mineral oil, a 60% dispersed sodium hydride powder (0.096 g, 2.40 mmoL as NaH) was added, followed by stirring under reflux. After complete consumption of organic compound (B-1) was confirmed by thin-layer chromatography, the reaction solution was slowly dropwise added to a methanol solution of ammonium chloride. After the pH was confirmed to be neutralized, the obtained precipitates were subjected to centrifugal separation and recovered by suction filtration, sufficiently washed with methanol, AK225 and hexane, and then dried under reduced pressure at 100° C. to obtain a red-orange powder. Then, the obtained red-orange powder (1 g) and 4-acetoxystyrene (0.302 g, 1.86 mmoL) were reacted in DMAc in the presence of potassium hydroxide to prepare prepolymer (C2-3). The obtained DMAc solution of prepolymer (C2-3) was slowly added to an ammonium chloride aqueous solution again for reprecipitation and purification, followed by suction filtration, washing and vacuum drying to obtain orange powdery prepolymer (C2-3) (1.03 g, yield: 86.6%).

As a result of analysis of prepolymer (C2-3) by $^1$H-NMR, units derived from organic compound (B-1) and units derived from 4-acetoxystyrene were introduced in a molar ratio of 27:73.

Ex. 4

Prepolymer (T)

Organic compound (B-1) and acrylic chloride were vigorously stirred in the presence of triethylamine under cooling so that the internal temperature would not exceed 30° C. After completion of the reaction was confirmed by thin-layer chromatography, a hydrochloric acid aqueous solution was added, and the organic phase extracted with ethyl acetate was washed with a saturated sodium bicarbonate aqueous solution and water. The organic phase was dried over magnesium sulfate and concentrated, and remaining ethyl acetate was removed to prepare an acrylate of organic compound (B-1).

Then, 2-hydroxyethyl methacrylate (hereinafter sometimes referred to as "HEMA") was dissolved in methyl ethyl ketone, and the above obtained acrylate of organic compound (B-1) was added in such an amount that the molar ratio of HEMA and the acrylate would be 50:50. A thermal polymerization initiator was added thereto, and the system was sufficiently replaced with dry nitrogen, followed by stirring at 50° C. for 24 hours. To the solution, 2-acryloyloxyethyl isocyanate was added in an amount corresponding to 2 equivalent amount to HEMA, and as a catalyst, a 5 wt % methyl ethyl ketone solution of dibutyltin dilaurate was added, followed by stirring at 40° C. further for 24 hours. The obtained solution was slowly added to hexane for reprecipitation and purification, followed by suction filtration, washing and vacuum drying to obtain red powdery prepolymer (T).

Ex. 5

Prepolymer (A3-1)

Organic compound (B-2-b) (0.43 g, 0.811 mmoL) obtained in Preparation Example 3 and 1,1,1-tris(4-hydroxyphenyl)ethane (0.50 g, 1.63 mmoL) were stirred with heating in DMAc at 40° C. for 6 hours in the presence of potassium carbonate (1.03 g, 7.3 mmoL). Then, disappearance of the fluorine atom corresponding to the para-position of the pentafluoro group contained in organic compound (B-2-b) and a shift of fluorine atoms corresponding to the meta-positions were confirmed by $^{19}$F-NMR, and then perfluorobiphenyl was poured, followed by stirring with heating at 40° C. for 20 hours to produce prepolymer (A3-1). The obtained DMAc solution of prepolymer (A3-1) was subjected to filtration with Celite, and after the pH was confirmed to be neutralized, the solution was slowly added to a methanol aqueous solution of ammonium chloride for reprecipitation, and solid was collected by filtration. The solid was washed with methanol, AK225 and hexane and dried under reduced pressure to obtain red powdery prepolymer (A3-1) (1.53 g, yield: 87.4%). The number average molecular weight of prepolymer (A3-1) was 13,000. From $^{19}$F-NMR, the content of fluorine atoms corresponding to the para-position of perfluorobiphenyl contained in prepolymer (A3-1) was 0.464 mmoL per 1 g of prepolymer. The number average molecular weight and the fluorine atom content of the material and prepolymer (A3-1) are shown in Table 1.

Prepolymer (A3-1) was identified by $^1$H-NMR and $^{19}$F-NMR.

NMR spectra of prepolymer (A3-1):
$^1$H-NMR (300.4 MHz, solvent: CDCl$_3$, standard: TMS) δ (ppm): 1.13 (s, 3H), 2.16 (s, 3H), 3.30 (s, 2H), 4.03 (s, 2H), 4.73 (s, 2H), 6.75 (s, 2H), 6.77 to 7.18 (m, 30H), 7.81 (s, 1H), 7.83 to 7.90 (m, 4H), 8.31 (s, 2H)
$^{19}$F-NMR (282.7 MHz, solvent: CDCl$_3$, standard: CFCl$_3$) δ (ppm): −160.9 (s, 2F), −154.3 (s, 2F), −153.3 (s, 12F), −150.6 (s, 1F), −140.9 (s, 2F), −138.4 (s, 13F), −137.7 (s, 2F)

Exs. 6 and 7

Prepolymers (A3-2) and (A3-3)

Prepolymers (A3-2) and (A3-3) were prepared in the same manner as in Ex. 5 except for the materials as identified in Table 1. The number average molecular weight and the fluorine atom content of prepolymers (A3-2) and (A3-3) are shown in Table 1.

Prepolymers (A3-2) and (A3-3) were identified by $^1$H-NMR and $^{19}$F-NMR.

NMR spectra of prepolymer (A3-2):
$^1$H-NMR (300.4 MHz, solvent: CDCl$_3$, standard: TMS) δ (ppm): 1.13 (s, 3H), 2.16 (s, 3H), 3.32 (s, 2H), 4.03 (s, 2H), 4.73 (s, 2H), 6.75 (s, 2H), 6.94 to 7.05 (m, 30H), 7.63 (s, 1H), 7.82 to 7.90 (m, 4H), 8.31 (s, 2H)
$^{19}$F-NMR (282.7 MHz, solvent: CDCl$_3$, standard: CFCl$_3$) δ (ppm): −160.9 (s, 2F), −154.4 (s, 2F), −153.4 (s, 9F), −150.6 (s, 1F), −140.9 (s, 2F), −138.5 (s, 9F), −137.8 (s, 2F)

NMR spectra of prepolymer (A3-3):

$^1$H-NMR (300.4 MHz, solvent: CDCl$_3$, standard: TMS) δ (ppm): 1.0 (s, 3H), 1.11 (s, 3H), 2.16 (s, 6H), 3.28 (s, 2H), 3.90 (s, 2H), 4.01 (s, 2H), 4.61 (s, 2H), 4.71 (s, 2H), 6.54 (s, 2H), 6.93 to 7.26 (m), 7.65 (s, 2H), 7.82 to 8.30 (m), 8.28 (s, 4H)

$^{19}$F-NMR (282.7 MHz, solvent: CDCl$_3$, standard: CFCl$_3$) δ (ppm): −161.1 (s, 2F), −154.8 (s, 1F), −153.5 (s, 10F), −150.7 (s, 1F), −140.9 (s, 1F), −138.5 (s, 10F), −137.7 (s, 2F)

TABLE 1

|  |  | Ex. |  |  |
| --- | --- | --- | --- | --- |
|  |  | 5 | 6 | 7 |
| Organic compound (B) | Type | (B-2-b) | (B-2-b) | (B-2-a) |
|  | g | 0.43 | 0.22 | 0.22 |
|  | mmoL | 0.811 | 0.414 | 0.414 |
| 1,1,1-Tris(4-hydroxyphenyl)ethane | g | 0.50 | 0.50 | 0.50 |
|  | mmoL | 1.63 | 1.63 | 1.63 |
| Potassium carbonate | g | 1.03 | 1.02 | 1.02 |
|  | mmoL | 7.3 | 7.3 | 7.3 |
| Prepolymer obtained | Type | (A3-1) | (A3-2) | (A3-3) |
|  | g | 1.53 | 1.51 | 1.6 |
|  | Yield (%) | 87.4 | 93.2 | 98.7 |
| Number average molecular weight of prepolymer | — | 13,000 | 13,000 | 20,000 |
| Fluorine atom corresponding to para-position of perfluorobiphenyl contained in prepolymer | mmoL | 0.464 | 0.624 | 0.513 |

Ex. 8

Prepolymer (C4-1)

Prepolymer (A3-1) (1.2 g) obtained in Ex. 5 and 4-acetoxystyrene (0.117 g, 0.724 mmoL) were reacted in DMAc in the presence of potassium hydroxide at 0° C. to prepare prepolymer (C4-1). The obtained DMAc solution of prepolymer (C4-1) was subjected to filtration with Celite and then slowly added to a methanol aqueous solution of ammonium chloride again for reprecipitation and purification, followed by suction filtration, washing and vacuum drying to obtain orange powdery prepolymer (C4-1) (1.11 g, yield: 93%).

In prepolymer (C4-1), organic compound (B-2-b) and 4-acetoxystyrene were introduced in a molar ratio of 53:47, as confirmed by $^1$H-NMR.

By DSC measurement in the same manner as in Preparation Example 1, the glass transition temperature of prepolymer (C4-1) was 233° C., and was confirmed to be higher than the glass transition temperature of PMMA.

Prepolymer (C4-1) was identified by $^1$H-NMR and $^{19}$F-NMR.

NMR spectra of prepolymer (C4-1)

$^1$H-NMR (300.4 MHz, solvent: CDCl$_3$, standard: TMS) δ (ppm): 1.14 (s, 3H), 2.16 (s, 3H), 3.30 (s, 2H), 4.03 (s, 2H), 4.74 (s, 2H), 5.21 (d, 1H), 5.71 (d, 1H), 6.75 (s, 2H), 6.96 to 7.06 (m, 30H), 7.81 (s, 1H), 7.82 to 7.90 (m, 4H), 8.30 (s, 2H)

$^{19}$F-NMR (282.7 MHz, solvent: CDCl$_3$, standard: CFCl$_3$) δ (ppm): −154.3 (s, 2F), −153.4 (s, 25F), −140.9 (s, 2F), −138.5 (s, 25F)

Ex. 9 to 10

Prepolymers (C4-2) and (C4-3)

Prepolymers (C4-2) and (C4-3) were prepared in the same manner as in Ex. 8 except for the materials as identified in Table 2. The introduction ratio of organic compound (B-2-b) and 4-acetoxystyrene, and the glass transition temperature of prepolymers (C4-2) and (C4-3) are shown in Table 2. The glass transition temperatures of prepolymers (C4-2) and (C4-3) were confirmed to be higher than the glass transition temperature of PMMA.

Prepolymers (C4-2) and (C4-3) were identified by $^1$H-NMR and $^{19}$F-NMR.

NMR spectra of prepolymer (C4-2):

$^1$H-NMR (300.4 MHz, solvent: CDCl$_3$, standard: TMS) δ (ppm): 1.13 (s, 3H), 2.16 (s, 3H), 3.19 (s, 2H), 4.03 (s, 2H), 4.74 (s, 2H), 5.22 (d, 2H), 5.71 (d, 2H), 6.75 (s, 2H), 6.96 to 7.06 (m, 30H), 7.81 (s, 1H), 7.82 to 7.90 (m, 4H), 8.30 (s, 2H)

$^{19}$F-NMR (282.7 MHz, solvent: CDCl$_3$, standard: CFCl$_3$) δ (ppm): −154.3 (s, 2F), −153.4 (s, 10F), −140.9 (s, 2F), −138.5 (s, 10F)

NMR spectra of prepolymer (C4-3):

$^1$H-NMR (300.4 MHz, solvent: CDCl$_3$, standard: TMS) δ (ppm): 1.14 (s, 3H), 2.16 (s, 3H), 3.30 (s, 2H), 3.92 (s, 2H), 4.04 (s, 2H), 4.62 (s, 2H), 4.74 (s, 2H), 5.21 (d, 4H), 5.71 (d, 4H), 6.69 (s, 2H), 6.75 to 7.07 (m, 30H), 7.82 (s, 1H), 7.92 to 7.90 (m, 4H), 8.31 (s, 2H)

$^{19}$F-NMR (282.7 MHz, solvent: CDCl$_3$, standard: CFCl$_3$) δ (ppm): −154.3 (s, 2F), −153.4 (s, 10F), −140.9 (s, 2F), −138.5 (s, 10F)

TABLE 2

|  |  | Ex. |  |  |
| --- | --- | --- | --- | --- |
|  |  | 8 | 9 | 10 |
| Prepolymer | Type | (A3-1) | (A3-2) | (A3-3) |
|  | g | 1.2 | 1.2 | 1.03 |
| 4-Acetoxystyrene | g | 0.12 | 0.158 | 0.108 |
|  | mmoL | 0.724 | 0.973 | 0.67 |
| Prepolymer obtained | Type | (C4-1) | (C4-2) | (C4-3) |
|  | g | 1.11 | 1.16 | 1.00 |
|  | Yield (%) | 93 | 96 | 97 |
| Introduction ratio (molar ratio) of organic compound (B) to 4-acetoxystyrene |  | 53:47 | 32:68 | 32:68 |
| Glass transition temperature (° C.) |  | 233 | 251 | 259 |

Ex. 11 to 17

Prepolymer as identified in Table 3 was dissolved in PGMEA (propylene glycol monoethyl ether acetate) so that the solid content concentration would be 15 mass % to prepare a coating composition.

Using the obtained coating composition, the nonlinear optical effect (SHG intensity), the maintenance ratio of the SHG intensity after held at 80° C. for 5 hours, the dielectric voltage and the transparency were evaluated as follows. The results are shown in Table 1.

(Nonlinear Optical Effect (SHG Intensity))

The coating composition was subjected to filtration through a polytetrafluoroethylene filter having a pore size of 0.5 μm, and then applied to the surface on an ITO electrode side of a glass substrate provided with an ITO electrode by a spin coating method and dried at 150° C. for 5 minutes to form a coating film made of the prepolymer having a film thickness of 2 μm.

Then, polling treatment and heat curing reaction were carried out to prepare a nonlinear optical material. That is, on a hotplate heated to 200° C., the glass substrate provided with an ITO electrode having the above coating film formed thereon was placed, and a releasable PET film was placed thereon. While an electric field of 7.5 kV/cm was applied to between the ITO electrode and the needle electrode placed on the upper part (4 mm), heating was carried out at 200° C. for 60 minutes to form a cured film, followed by cooling to 50° C., and application of the electric field was terminated.

The SHG intensity of the obtained nonlinear optical material was measured as follows.

A laser light at a wavelength of 1,064 nm emitted from a YAG laser in the cured film direction was applied to the nonlinear optical material formed on the glass substrate provided with an ITO electrode, and the intensity of SHG at a wavelength of 532 nm (hereinafter sometimes referred to as "SHG intensity") was measured by using a photomultiplier tube as a detector. The laser light at 1,064 nm which was transmitted through the nonlinear optical material was shuttered by an infrared absorption filter, and only the SHG intensity at 532 nm was withdrawn by a monochromator and measured. The higher the SHG intensity, the more excellent the second order nonlinear optical effect.

(Maintenance Ratio of SHG Intensity after Held at 80° C. for 5 Hours)

The nonlinear optical material prepared for evaluation of the SHG intensity was left at rest in an inert oven at 80° C. and held for 5 hours. After a lapse of the predetermined time, the nonlinear optical material was taken out from the oven, and the SHG intensity was measured again. The maintenance ratio was calculated from the SHG intensity after held at 80° C. for 5 hours as the numerator to the SHG intensity before put in the inert oven as the denominator. A higher maintenance ratio indicates that the material is excellent in the heat resistance.

(Maintenance Ratio of SHG Intensity after Held at 120° C. for 30 Minutes/at 140° C. for 30 Minutes/at 160° C. for 30 Minutes)

The maintenance ratio was measured and calculated in the same manner as the maintenance ratio of the SHG intensity after held at 80° C. for 5 hours except that the temperature and the time were changed.

(Dielectric Voltage)

The coating composition was applied to a silicon substrate by a spin coater and heated by a hotplate at 70° C. for 90 seconds, followed by exposure with an irradiation energy of 500 mJ/cm$^2$. Then, using a developer obtained by mixing PGMEA/ethyl lactate in a mass ratio of 50:50, puddle development was carried out for 30 seconds and then rinsing was carried out using the same developer for 30 seconds, and spin drying was carried out at 2,000 revolutions per minute for 30 seconds. Then, using a hotplate, heating was carried out at 100° C. for 90 seconds. Then, using a vertical furnace, final baking was carried out at 200° C. for 60 minutes in a nitrogen atmosphere to obtain a cured film having a film thickness of 1.5 μm.

Of the cured film, the dielectric voltage was measured by using mercury CV measuring apparatus SSM495 manufactured by SMM Inc.

(Transparency)

The transparency at wavelength used (1.3 μm band and 1.5 μm band) was evaluated by measuring the transmission loss to the wavelength used. First, the coating composition was applied to a silicon substrate by a spin coater and heated by using a hotplate at 70° C. for 90 seconds to prepare a cured film having a film thickness of 2 μm. The transmission loss of the cured film was measured by a prism coupler method using prism coupler SPA-4000 manufactured by SAIRON TECHNOLOGY, INC., and evaluated based on the following standards.

○ (good): transmission loss at 1,310 nm being at most 2 dB/cm x (bad): transmission loss at 1,310 nm being higher than 2 dB/cm

TABLE 3

| | | Evaluation of nonlinear optical material | | | | | | |
|---|---|---|---|---|---|---|---|---|
| Ex. | Prepolymer | Nonlinear optical effect (SHG) [optional unit] | Maintenance ratio of SHG intensity after held at 80° C. for 5 hours [%] | Maintenance ratio of SHG intensity after held at 120° C. for 30 hours [%] | Maintenance ratio of SHG intensity after held at 140° C. for 30 hours [%] | Maintenance ratio of SHG intensity after held at 160° C. for 30 hours [%] | Dielectric voltage [MV/cm] | Transparency |
| 11 | (C2-1) | 2.36 | 55 | 67 | 24 | 0 | 5 | ○ |
| 12 | (C2-2) | 2.10 | 80 | 92 | 81 | 33 | 5 | ○ |
| 13 | (C2-3) | 2.28 | 95 | 92 | 86 | 62 | 5 | ○ |
| 14 | (C4-1) | 2.48 | — | 88 | 83 | 52 | 5 | ○ |
| 15 | (C4-2) | 2.25 | — | 89 | 84 | 84 | 5 | ○ |
| 16 | (C4-3) | 2.31 | — | 73 | 54 | 39 | 5 | ○ |
| 17 | (T) | 2.00 | 20 | ≤10 | ≤10 | ≤10 | 0.2 | x |

As mentioned above, Tgs of prepolymers (A2-1) and (A2-2) prepared in Preparation Examples 1 and 2 were respectively 130° C. and 170° C. and were sufficiently higher than that of PMMA.

Nonlinear optical materials (Ex. 11 to 13) formed from prepolymers (C2-1) to (C2-3) prepared in Ex. 1 to 3 using such prepolymers, had excellent nonlinear optical effect, heat resistance, dielectric voltage and transparency. By comparison between Ex. 11 and 12, the maintenance ratio of the SHG intensity which is an index of the nonlinear optical effect after held at high temperature was higher in Ex. 12 in which the nonlinear optical material was formed from prepolymer (C2-2). Tg of prepolymer (A2-2) used for preparation was higher, and it is considered that prepolymer (C2-2) had excellent heat resistance. Further, by comparison between Ex. 12 and 13, the maintenance ratio of the SHG intensity after held at high temperature was higher in Ex. 13 in which the nonlinear optical material was formed from prepolymer (C2-3). It is considered that since the crosslink density of prepolymer (A2-3) used for preparation is higher, prepolymer (C2-3) had excellent heat resistance.

Tgs of prepolymers (A3-1), (A3-2) and (A3-3) prepared in Exs. 5 to 7 were 233° C., 251° C. and 259° C., respectively, and were sufficiently higher than that of PMMA.

Nonlinear optical materials (Exs. 14 to 16) formed from prepolymers (C4-1) to (C4-3) prepared in Exs. 8 to 10 using such prepolymers had excellent nonlinear optical effect, heat resistance, dielectric voltage and transparency. By comparison between Ex. 15 and 16, the maintenance ratio of the SHG intensity after held at high temperature was higher in Ex. 15 in which the nonlinear optical material was formed from prepolymer (C4-2). Prepolymer (C4-2) contains a 1,4-isomer which is a highly linear dye as the main component, and it is considered that its molecules are likely to be stereoregularly oriented, and the maintenance ratio was high.

Whereas, the nonlinear optical material (Ex. 17) formed from prepolymer (T) in Ex. 4 having a structure such that organic compound (B-1) was bonded to the poly(meth)acrylate skeleton, was inferior in the nonlinear optical effect to Exs. 11 to 16, had insufficient heat resistance and had low dielectric voltage. Further, its transparency in the 1.3 μm band and 1.5 μm band was insufficient.

INDUSTRIAL APPLICABILITY

The prepolymer (C) of the present invention is useful as a material of a nonlinear optical material to be used for a light control device (such as an optical modulator or an optical switch) utilizing the EO effect.

REFERENCE SYMBOLS

1: Optical waveguide
10: Core
11: Core
12: Core precursor layer
20: Clad
22: Under clad layer
24: Over clad layer
30: Substrate
40: Control electrode
42: Polarizer
44: Sensor
46: Outer control electrode
48: Inner control electrode

What is claimed is:

1. A prepolymer, comprising
a condensate formed by a reaction including at least a dehydrohalogenation condensation reaction of a compound (X), a compound (Y), a compound (Z), and an organic compound (B),
wherein:
the prepolymer comprises crosslinkable functional groups,
the compound (X) is at least one compound selected from the group consisting of a compound (X1) that comprises a crosslinkable functional group and a phenolic hydroxy group; a compound (X2) that comprises a crosslinkable functional group and a fluorine atom-substituted aromatic ring, but does not comprise a phenolic hydroxy group or an aromatic ring substituted by a haloalkyl group comprising at most 8 carbon atoms; and a compound (X3) that comprises a crosslinkable functional group and an aromatic ring substituted by a haloalkyl group comprising at most 8 carbon atoms but does not comprise a phenolic hydroxy group;
at least one compound (X) is the compound (X1) or the compound (X2),
the compound (Y) is a compound represented by the following formula (Y);
the compound (Z) is a compound comprising at least 3 phenolic hydroxy groups but no crosslinkable functional group; and
the organic compound (B) is an organic compound developing a nonlinear optical effect and comprising a reactive group;

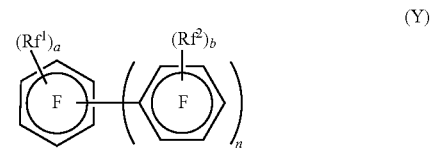

wherein n is an integer of from 0 to 3, each of a and b is independently an integer of from 0 to 3, each of $Rf^1$ and $Rf^2$ is independently a fluoroalkyl group comprising at most 8 carbon atoms, a nitrile group or a nitro group, and F in the aromatic ring represents that all the hydrogen atoms of the aromatic ring are substituted by a fluorine atom.

2. The prepolymer according to claim 1, which is a prepolymer (C1) obtained by reacting the organic compound (B) with a fluorinated polyarylene ether prepolymer (A1) obtained by subjecting the compound (X), the compound (Y) and the compound (Z) to a condensation reaction in the presence of a dehydrohalogenating agent.

3. The prepolymer according to claim 1, which is a prepolymer (C2) obtained by reacting the organic compound (B) and the compound (X) with a fluorinated polyarylene ether prepolymer (A2) obtained by subjecting the compound (Y) and the compound (Z) to a condensation reaction in the presence of a dehydrohalogenating agent.

4. The prepolymer according to claim 1, which is a prepolymer (C3) obtained by reacting the organic compound (B) and the compound (X) with a fluorinated polyarylene ether prepolymer (A1) obtained by subjecting the compound (X), the compound (Y) and the compound (Z) to a condensation reaction in the presence of a dehydrohalogenating agent.

5. The prepolymer according to claim 1, which is a prepolymer (C4) obtained by reacting the compound (X) to a fluorinated polyarylene ether prepolymer (A3) obtained by subjecting the compound (Z) and the organic compound (B) to a condensation reaction in the presence of a dehydrohalogenating agent to obtain a condensate, and further subjecting the compound (Y) to a condensation reaction with the obtained condensate in the presence of a dehydrohalogenating agent.

6. The prepolymer according to claim 1, wherein the organic compound (B) has a second order molecular hyperpolarizability of at least $10^{-30}$ esu.

7. The prepolymer according to claim 1, wherein the organic compound (B) is a compound having a structure such that an electron-withdrawing group and an electron-donating group are bridged by a π electron conjugated system.

8. The prepolymer according to claim 1, wherein the reactive group in the organic compound (B) is a group selected from the group consisting of a hydroxy group, a mercapto group, an amino group, a vinyl(oxy) group, an allyl(oxy) group, an epoxy group, a maleimide group, an azide group, an isocyanate group, a methacryloyl(oxy) group, an acryloyl(oxy) group, a trifluorovinyl(oxy) group, an ethynyl group, a 1-oxocyclopenta-2,5-dien-3-yl group, a diarylhydroxymethyl group, a hydroxyfluorenyl group, a halogenated aromatic ring, a cyclobutalene ring and an oxirane ring.

9. The prepolymer according to claim 1, wherein a proportion of moles of units derived from the organic compound (B) to a total number of moles of units derived from the compound (X), units derived from the compound (Y), units derived from the compound (Z) and the units derived from the organic compound (B) is from 1 to 60 mol %.

10. A curable material, comprising the prepolymer according to claim 1.

11. A coating composition, comprising the curable material according to claim 10 and a solvent (S).

12. A nonlinear optical material, which is a cured product of the curable material according to claim 10, wherein units derived from the organic compound (B) in the cured product are oriented.

13. An optical waveguide, of which either one or both of a core and a clad is made of the nonlinear optical material according to claim 12.

14. A light control device, comprising the optical waveguide according to claim 13, and electrodes to apply a voltage to the nonlinear optical material.

15. The prepolymer according to claim 1, wherein the compound (X) is the compound (X1).

16. The prepolymer according to claim 1, wherein the compound (X) is the compound (X2).

17. The prepolymer according to claim 1, wherein the compound (X) comprises the compound (X3).

18. The prepolymer according to claim 1, wherein the compound (X) is a mixture of the compound (X1), the compound (X2), and the compound (X3).

19. The prepolymer according to claim 1, wherein a molar ratio of units derived from the organic compound (B) to the crosslinkable functional groups in the prepolymer is from 60:40 to 1:99.

* * * * *